(12) United States Patent
Sato et al.

(10) Patent No.: US 11,151,122 B2
(45) Date of Patent: Oct. 19, 2021

(54) DISTRIBUTED LEDGER DATA LINKAGE MANAGEMENT

(71) Applicant: Hitachi, Ltd., Tokyo (JP)

(72) Inventors: Tatsuya Sato, Tokyo (JP); Yusuke Arai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 189 days.

(21) Appl. No.: 16/575,538

(22) Filed: Sep. 19, 2019

(65) Prior Publication Data

US 2020/0311051 A1 Oct. 1, 2020

(30) Foreign Application Priority Data

Mar. 25, 2019 (JP) .............................. JP2019-056283

(51) Int. Cl.
G06F 16/23 (2019.01)
(52) U.S. Cl.
CPC ...... G06F 16/2365 (2019.01); G06F 16/2379 (2019.01)
(58) Field of Classification Search
None
See application file for complete search history.

(56) References Cited

U.S. PATENT DOCUMENTS

| 9,967,238 B1* | 5/2018 | Hogan | H04L 63/0435 |
| 2017/0250972 A1* | 8/2017 | Ronda | H04L 9/08 |
| 2018/0227275 A1* | 8/2018 | Russinovich | H04L 9/3265 |
| 2019/0073244 A1* | 3/2019 | Fung | H04L 41/0893 |
| 2020/0220770 A1* | 7/2020 | Kawahara | H04L 41/0654 |

FOREIGN PATENT DOCUMENTS

JP 2017-204707 A 11/2017

OTHER PUBLICATIONS

"A Peer-to-Peer Electronic Cash System", [online] [Retrieved Mar. 31, 2017], Internet<URL: https://bitcoin.org/bitcoin.pdf>.
"Ethereum White Paper", [online] [Retrieved Mar. 31, 2017] Internet<URL:https//github.com/ethereum/wiki/wiki/[English]-White-Paper>.
"Hyperledger Fabric", [online] [Retrieved Mar. 31, 2017], Internet<URL: https://hyperledger-fabric.readthedocs.io/en/latest/>.

* cited by examiner

Primary Examiner — Scott A. Waldron
(74) Attorney, Agent, or Firm — Baker Botts L.L.P.

(57) ABSTRACT

In a data linkage management system, at least each node of a specified plurality of organizations among a plurality of nodes holds a tolerance range rule that defines a specified tolerance range relating to discrepancies among data acquired from a specified external system, and forms a consensus that tolerates discrepancies among the data by passing a tolerance pass-fail judgment relating to discrepancies among the data according to the tolerance range rule in regards to a transaction issued by each node for the data.

9 Claims, 22 Drawing Sheets

| SC ID D12000 | STATE TYPE D12001 | CONSENSUS STANDARD D12003 ||||| DATA ACQUISITION METHOD D12008 ||
| | | NUMBER OF ORGANIZATIONS D12004 | TOLERANCE RANGE D12005 | CONVERGENCE METHOD D12006 | PROCESSING ORGANIZATION SELECTION METHOD D12007 | ACQUIRE DATA FROM INSIDE SC OR AGENT D12009 | DATA ACQUISITION PROCESSING D12010 |
|---|---|---|---|---|---|---|---|
| ... | ... | ... | ... | ... | ... | ... | ... |
| BUSINESS A_METERING | USER UTILIZATION | TOTAL OF 3 ORGANIZATIONS OR MORE | TIME: ±3SEC. VALUE: WITHIN ±5% | TIME: MAXIMUM VALUE, VALUE: AVERAGE VALUE | SEQUENTIAL SELECTION | AGENT | ⟨REFERENCE 1⟩ D12020 |
| BUSINESS B_EXCELLENT CUSTOMER ANALYSIS | CUSTOMER SCORE | TOTAL OF 3 ORGANIZATIONS OR MORE | TIME: ±10SEC. VALUE: WITHIN ±3% | TIME: MAXIMUM VALUE, VALUE: MINIMUM VALUE | RANDOM SELECTION | AGENT | ⟨REFERENCE 2⟩ D12021 |
| ... | ... | ... | ... | ... | ... | ... | ... |

FIG. 7A

<REFERENCE 1>

| STEP ID | EXTERNAL PROCESSING ID | TARGET | CATEGORY | INPUT | PROCESSING | OUTPUT | ... | ... |
|---|---|---|---|---|---|---|---|---|
| 1 | DATA ACQUISITION | SERVICE 1 | REST | USER ID | [API_URL]/meter/user/[ USER ID ] | STEP1. PROCESSING RESULTS | | |

<REFERENCE 2>

| STEP ID | EXTERNAL PROCESSING ID | TARGET | CATEGORY | INPUT | PROCESSING | OUTPUT | | | |
|---|---|---|---|---|---|---|---|---|---|
| 1 | DATA LOAD | LEDGER | REFER TO DISTRIBUTED LEDGER | CUSTOMER ID | REFER TX.BUSINESS B. ALL TRANSACTION REFER({CUSTOMER ID}) | STEP 1 PROCESSING RESULTS | ... | ... | ... |
| 2 | CUSTOMER ANALYSIS COMMAND EXECUTION | ANALYSIS APPLICATION | COMMAND | STEP1. OUTPUT | customer_analysis[STEP1. OUTPUT] | STEP 2 PROCESSING RESULTS | | | |

FIG. 7C

| SC ID | STATE TYPE | STATE ID | REQUEST ID | MANAGEMENT STATE | TIME | REGISTERED ORGANIZATION | VALUE | EXTERNAL PROCESSING EVIDENCE | |
|---|---|---|---|---|---|---|---|---|---|
| ... | ... | ... | ... | ... | ... | ... | ... | ... | ... |
| BUSINESS A_METERING | USER UTILIZATION | USER a UTILIZATION | 100 | TEMPORARY | (OMITTED):01 | ORGANIZATION 1 | 70 | (OMITTED) | ... |
| BUSINESS A_METERING | USER UTILIZATION | USER a UTILIZATION | 100 | TEMPORARY | (OMITTED):02 | ORGANIZATION 2 | 72 | (OMITTED) | ... |
| BUSINESS A_METERING | USER UTILIZATION | USER a UTILIZATION | 100 | TEMPORARY | (OMITTED):02 | ORGANIZATION 3 | 75 | (OMITTED) | ... |
| BUSINESS A_METERING | USER UTILIZATION | USER a UTILIZATION | 100 | CONFIRMED | (OMITTED):02 | ORGANIZATION 1,2,3 | 72.3 | (OMITTED) | ... |
| ... | ... | ... | ... | ... | ... | ... | ... | ... | ... |
| BUSINESS B_EXCELLENT CUSTOMER ANALYSIS | CUSTOMER SCORE | CUSTOMER b SCORE | 2001 | TEMPORARY | (OMITTED):31 | ORGANIZATION 1 | 89 | (OMITTED) | ... |
| BUSINESS B_EXCELLENT CUSTOMER ANALYSIS | CUSTOMER SCORE | CUSTOMER b SCORE | 2001 | TEMPORARY | (OMITTED):34 | ORGANIZATION 2 | 91 | (OMITTED) | ... |
| BUSINESS B_EXCELLENT CUSTOMER ANALYSIS | CUSTOMER SCORE | CUSTOMER b SCORE | 2001 | TEMPORARY | (OMITTED):35 | ORGANIZATION 3 | 90 | (OMITTED) | ... |
| BUSINESS B_EXCELLENT CUSTOMER ANALYSIS | CUSTOMER SCORE | CUSTOMER b SCORE | 2001 | CONFIRMED | (OMITTED):35 | ORGANIZATION 1,2,3 | 89 | (OMITTED) | ... |
| ... | ... | ... | ... | ... | ... | ... | ... | ... | ... |

FIG. 8

| SC ID | STATE TYPE | STATE ID | REQUEST ID | ORGANIZATION HANDLING PROCESSING | INPUT | DATA ACQUISITION PROCESSING | |
|---|---|---|---|---|---|---|---|
| ... | ... | ... | ... | ... | ... | ... | ... |
| BUSINESS A_ METERING | USER UTILIZATION | USER a UTILIZATION | 100 | ORGANIZATIONS 1, 2, 3 | USER ID: USER a | <REFERENCE 1> | ... |
| ... | ... | ... | ... | ... | ... | ... | ... |
| BUSINESS B_ EXCELLENT CUSTOMER ANALYSIS | CUSTOMER SCORE | CUSTOMER b SCORE | 2001 | ORGANIZATIONS 1, 2, 3 | CUSTOMER ID: CUSTOMER b | <REFERENCE 2> | ... |
| ... | ... | ... | ... | ... | ... | ... | ... |

FIG. 9

| SC ID | STATE TYPE | STATE ID | REQUEST ID | ORGANIZATION | JUDGMENT RESULT | REASON | ... |
|---|---|---|---|---|---|---|---|
| BUSINESS A_METERING | USER UTILIZATION | USER a UTILIZATION | 101 | ORGANIZATION 2 | FAIL | ALUE EXCEEDS 20% | ... |
| ... | ... | ... | ... | ... | ... | ... | ... |

FIG. 16

| SC ID | STATE TYPE | ORGANIZATION | DEGREE OF TRUSTWORTHINESS | ... |
|---|---|---|---|---|
| BUSINESS A_METERING | USER UTILIZATION | ORGANIZATION 1 | 100 | ... |
| BUSINESS A_METERING | USER UTILIZATION | ORGANIZATION 2 | 80 | ... |
| ... | ... | ... | ... | ... |

FIG. 17

DISTRIBUTED LEDGER DATA LINKAGE MANAGEMENT

CROSS-REFERENCE TO RELATED APPLICATION

This application claims priority pursuant to 35 U.S.C. § 119 from Japanese Patent Application No. 2019-56283, filed on Mar. 25, 2019, the entire disclosure of which is incorporated herein by reference.

BACKGROUND

Technical Field

The present invention relates to a data linkage management method, a data linkage management system, and a node.

Related Art

Distributed ledger technology (DLT) is known as a technology to substitute a direct transaction between users P2P (Peer to Peer) for transactions conventionally carried out by way of trusted centralized organizations such as government and financial institutions.

For example, "A Peer-to-Peer Electronic Cash System", [online] [Retrieved Mar. 31, 2017], Internet<URL: https://bitcoin.org/bitcoin.pdf> discloses technology for settlement of transactions by using a virtual currency without requiring a centralized organization such as a bank. In the virtual currency system, after judging the validity of the transaction data (hereafter, also called transaction) by a node called the minor on the P2P network, the transaction is confirmed by a specific hash value calculation called proof-of-work. The confirmed transaction is summarized into one block and recorded in a distributed ledger called a blockchain (hereafter also called BC).

In recent years, various derived technology has been proposed regarding BC and distributed ledger, and continues to evolve from the BC implemented based on the above described technology of "A Peer-to-Peer Electronic Cash System", [online] [Retrieved Mar. 31, 2017], Internet<URL: https://bitcoin.org/bitcoin.pdf>.

The current main features of BC are given such as: (1) the transaction between participants on the distributed ledger network is confirmed by forming a consensus and obtaining approval of the (optional or specific) participants instead of utilizing a centralized organization, (2) summarizing a plurality of transactions as blocks and recording them joined as a string in the distributed ledger, and applying a hash calculation to consecutive blocks, so that tampering with the blocks is virtually impossible and (3) all participants share the same ledger data so that all participants in the transaction can be confirmed.

Based on the above described features, distributed ledger technology including BC is being widely studied for applications in wide range of fields such as the financial field and Internet of Things (IoT) as an arrangement for monitoring and sharing of reliable data, and executing and managing transactions based on contracts.

By utilizing a platform that provides a distributed ledger (hereafter, referred to as a distributed ledger platform), sharing information and transactions can be performed among a plurality of entities without management by a centralized organization (for example, a plurality of companies relating to a consortium or a supply chain in a specific industry of field).

A network of participants (and their nodes) taking part in the distributed ledger is referred to as a distributed ledger network.

The distributed ledger is not merely the simple virtual currency transaction as in "A Peer-to-Peer Electronic Cash System", [online] [Retrieved Mar. 1, 2017], Internet<URL: https://bitcoin.org/bitcoin.pdf> but is also applicable to complex transaction conditions and diverse applications. Not only (transaction) data but also logic is becoming manageable within the distributed ledger. This logic is referred to as a smart contract (also called SC from hereon).

"Ethereum White Paper", [online] [Retrieved Mar. 31, 2017] Internet<URL: https//github.com/ethereum/wiki/wiki/[English]-White-Paper> and "Hyperledger Fabric", [online] [Retrieved Mar. 31, 2017], Internet<URL: https://hyperledger-fabric.readthedocs.io/en/latest/>, for example, disclose techniques relating to a distributed ledger platform having this type of SC execution function. In these distributed ledger platforms, a transaction (also referred to as TX from hereon) is accepted while a consensus is formed between nodes based on specified consensus standards, and the information (ledger) is shared on a plurality of nodes by executing the TX on each node.

The distributed ledger platforms also include a smart contract (SC) execution function that executes predetermined logic for TX.

As a typical usage form of distributed ledger technology, in addition to the public type in which a large number of unspecified computing resources (nodes) such as BC based on the above-mentioned "A Peer-to-Peer Electronic Cash System", [online] [Retrieved Mar. 31, 2017], Internet<URL: https://bitcoin.org/bitcoin.pdf> form a distributed ledger network, the consortium type that forms a distributed ledger network with nodes between specific companies and organizations appears especially promising for business enterprises.

Each node of a plurality of organizations participating in this type of consortium can be determined beforehand while synchronizing and linking based on the distributed consensus protocol and can also automatically execute transactions according to coded contract contents (SC).

In a system constructed utilizing distributed ledger technology (referred to as a distributed ledger system from hereon), a use case assumes the inputting and outputting of data by way of an external system (especially, a non-distributed ledger system) as one example of such usage.

For example, in one case, the data generated and monitored by an external system flows into a distributed ledger system for shared usage within a plurality of organizations (data flow: acquired external data—distributed ledger).

One specific case assumes that IoT sensor data such as temperature and driving data for cars that are externally generated are input into a distributed ledger and contracts (temperature and fines for excessive speed) are executed according to those values.

In another example, for a particular purpose, a consortium participant registers results of analysis in an external system in a distributed ledger system, and performs some type of processing or judgment based on the data within the plurality of organizations of the consortium.

A specific example is, when analyzing excellent scores of customers and companies using the transaction data and the settlement data accumulated in the distributed ledger that are input, applying complicated analysis such as by artificial intelligence (AI) by utilizing an external system for analysis processing (processing on non-distributed ledger); and then storing those results into the distributed ledger again (data flow: distributed ledger→external data processing→distributed ledger).

Alternatively, cases can be assumed in which only inquiries of good scores are carried out by way of the distributed ledger, and analysis processing is performed using data accumulated in the external systems possessed by each of the organizations and the analysis mechanism, and those results are stored in distributed ledger system (data flow: external data processing=distributed ledger).

In cases using a distributed ledger system linking with a non-distributed ledger system as described above, processing is performed by a decentralized processing mechanism outside of the distributed ledger system that guarantees the reliability and safety.

The safety of data processed and registered by way of the external system therefore deteriorates (lower reliability, fraud risk occurrence). For example, when there is data processing or data entry by way of an external system by a single organization, that organization is the single point of reliability.

In contrast, a technology has been disclosed for guaranteeing the authenticity of the data (see Japanese Unexamined Patent Application Publication No. 2017-204707) by commonly sharing a data generation method itself among organizations, and by registering the hash value of the data and the metadata (GPS, terminal information, etc.) accompanying the data into the distributed ledger when generating the data. The technology in this example is capable of guaranteeing the authenticity under the precondition that modifications are made to the data generation method.

However, modifications cannot be always made to the data generator in the external system. Therefore, the above technology has the problem that the applicable range is limited. In this example, a centralized organization is required to manage the shared data generation method and data analysis method. So this technology also leads to the problem of not sufficiently utilizing the decentralized features of the distributed ledger system.

Another method applies a conventional distributed ledger or SC mechanism such as disclosed in "Ethereum White Paper", [online], [Retrieved Mar. 31, 2017], Internet <URL: https://github.com/ethereum/wiki/wiki/[English]-White-Paper> and "Hyperledger Fabric", [online] [Retrieved Mar. 31, 2017], Internet <URL: https://hyperledger-fabric.readthedocs.io/en/latest/> described above. A plurality of organizations respectively prepare paths for coupling to the external systems, respectively acquire data from the external systems, and if a consensus can be formed the method can prevent fraud by a single organization.

However, a current distributed ledger such as disclosed on "Ethereum White Paper", [online], [Retrieved Mar. 31, 2017], Internet <URL: https://github.com/ethereum/wiki/wiki/[English]-White-Paper> and "Hyperledger Fabric", [online] [Retrieved Mar. 31, 2017], Internet <URL: https://hyperledger-fabric.readthedocs.io/en/latest/> cannot handle TX including non-determined processes. Here, a non-determined process is a process whose results vary according to the node and executing timing.

In this case, since a plurality of nodes perform common processing in parallel within the distributed ledger, the state and the calculation results between nodes deviate when there is a non-determined TX, thus causing large problems.

In other words, if the data acquired by each organization does not completely match, the individual calculation results will deviate and the agreement will fail (called non-deterministic processing). Therefore, even if the plurality of organizations acquires the data, deviations and variations may occur depending on the acquisition timing, the method, and the authority of the external system data. The problem of difficulty in applying the processing then arises.

An object of the present invention is therefore to provide a technology for efficient data linking between a distributed ledger system and a non-distributed ledger system without relying on a single organization and further executable while retaining objectivity.

SUMMARY OF THE INVENTION

A data linkage management method according to an aspect of the present invention to resolve the aforementioned issues, in a distributed ledger system configured from a plurality of nodes, in which at least each node of a specific plurality of organizations among the plurality of nodes holds a tolerance range rule for a defined tolerance range relating to discrepancies among data acquired from specified external systems in each node, and forms a consensus by tolerating discrepancies among the data by passing through the tolerance pass-fail judgement relating to discrepancies among the data according to the tolerance range rule in regards to transactions issued by each node for the data.

Also, the data linkage management system according to another aspect of the present invention is a distributed ledger system configured from a plurality of nodes, in which each node of at least a specific plurality of organizations among the plurality of nodes holds a tolerance range rule for a defined tolerance range relating to discrepancies among data acquired from specified external systems, and forms a consensus by tolerating discrepancies among the data by passing through the tolerance pass-fail judgement relating to discrepancies among the data according to the tolerance range rule in regards to transactions issued by each node for the data.

Further, according to another aspect, a node of the present invention is any node among a plurality of nodes configuring the distributed ledger system, in which the plurality of nodes hold a tolerance range rule for a defined tolerance range relating to discrepancies among data acquired from specified external systems, and forms a consensus by tolerating discrepancies among the data by passing through the tolerance pass-fail judgement according to the tolerance range rules in regards to transactions issued by each node for the data.

The present invention is therefore capable of providing efficient data linking between the distributed ledger system and a non-distributed ledger system without relying on a single organization and further executable while retaining objectivity

BRIEF DESCRIPTION OF THE DRAWINGS

FIG. 7A is a drawing showing a data linkage adjustment and convergence rule managed as state information of the data linkage SC;

FIG. 7B is a drawing showing an example 1 of a data acquisition process of the data linkage adjustment and convergence rule;

FIG. 7C is a drawing showing an example 2 of the data acquisition process of the data linkage adjustment and convergence rule;

FIG. 8 is a drawing showing a registered data managed as state information of the data linkage SC;

FIG. 9 is a drawing showing a linkage processing event issued as an event of the data linkage SC;

FIG. 16 is a drawing showing data linkage pass-fail results managed as state information of the data linkage SC in the third embodiment;

FIG. 17 is a drawing showing the data linkage credit analysis results managed as state information of the data linkage SC in the third embodiment;

DETAILED DESCRIPTION OF THE EMBODIMENTS

First Embodiment

Figure 1:
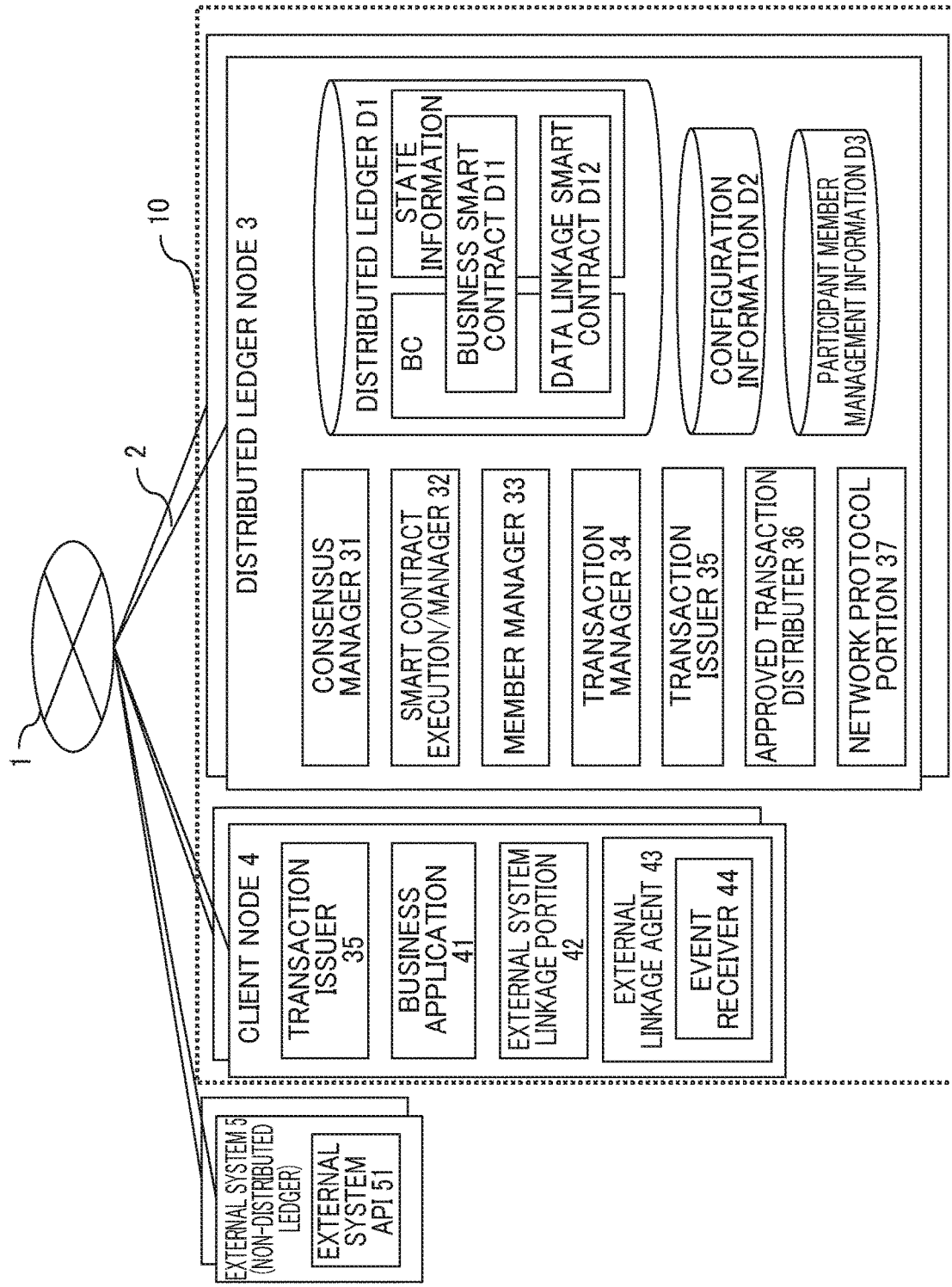
FIG. 1 is a drawing showing a configuration example of a computer system of the first embodiment.

FIG. 1 shows a configuration example including the distributed ledger system 10 and the external system 5 serving as the computer system of the first embodiment. In the first embodiment, the distributed ledger system 10 is assumed to require a data linkage with the external system 5 (mainly, a non-distributed ledger system). A plurality of connection paths is also prepared for the data linkage so that the distributed ledger system 10 and the external system 5 are not dependent on connection paths with a single organization.

Moreover, among a plurality of organizations, the tolerance range (tolerance range swing in values among data) of data for data input and output results via the external system 5 and its convergence method (called data linkage adjustment and convergence rule) are defined as the data linkage SC (shared framework).

Further, when an execution TX for data linkage SC is issued as a data linkage request to a node configuring the distributed ledger system 10 (hereafter called distributed ledger node 3), the data acquisition and processing is performed via the external system 5 in accordance with the data linkage adjustment and convergence rules defined in the data linkage SC_D12 via the distributed ledger system 10. The result converges as unique data within a certain range.

Each processing such as the convergence described above is managed by the SC function on a plurality of distributed ledger nodes 3, so a link can be made with external data without having to rely on a single organization in accordance with the predetermined rules of a consortium (configured from a plurality of organizations each operating the distributed ledger node 3) so that handling of non-deterministic data can be performed based on consensus building at the business (SC) layer.

Here, an overview of the processing elements in the present embodiment is as follows.

1. Define a data linkage SC (for each business or data) and place in the distributed ledger D1. The data linkage SC includes the following.
   Defining a method for selecting an externally linking processing organization (and each data acquisition).
   Defining tolerance range and convergence methods for processing results (e.g., aggregation logic).
2. When issuing a request TX to the data linkage SC, the data linkage SC receives the request TX and makes a request for linkage processing to a plurality of organizations. In addition, the data linkage SC registers the results acquired and processed by way of the external systems by the plurality of organizations as a temporary data entry in the distributed ledger D1. In regards to these plurality of temporary data entries, a judgement is made whether or not a number of the agreed organizations satisfies the predetermined consensus standards and the relevant data values are within the tolerance range, and if satisfying each of the standards, the plurality of entries are converged to calculate a unique value, and registered as confirmed data in the distributed ledger D1.

Also, the following flow is mainly assumed as the pattern for performing data linkage between the distributed ledger system 10 and the external system 5.

Data flow: External data acquisition—distributed ledger.
   Example 1: Inputting externally generated metering data (IoT sensor data and automobile drive data) into the distributed ledger D1 and executing a contract (temperature and fines for excessive speed) according to those values.

Data acquisition paths are available from a plurality of participants by disclosing the consortium of the metering API, placement of a plurality of sensors for the same observation target, and monitoring from surrounding vehicles, etc. However, even in this case, deviations or variations may occur due to differences in the acquisition timing via the API or a sensor.

Example 2: Inputting cloud service metering data into a distributed ledger, and the billing amounts and the compliance state with the SLA (Service Level Agreement) are managed according to the values. Data acquisition paths can be provided for a plurality of participants by disclosing the metering API, service usage history API, and log reference API. However, even in this case, deviations and variations may occur depending on the acquisition timing via the API, authority, and acquisition method.

Data flow: Distributed ledger→external data processing→distributed ledger.
   Example: Analyzing excellent customer and company scores such as by the external system 5 (e.g., AI) for analysis processing by input of transaction data and payment data accumulated in the distributed ledger D1. Merely analyzing the data by a single organization may not give a clear picture of inputs and outputs so analysis is preferably made by the plurality of organizations. On the other hand, the results from complicated analysis processing using AI or the like might deviate somewhat even if the same input data is used due to random number irregularities during machine learning or execution.

Data flow: External data processing→distributed ledger

Example: Making only excellent score queries via the distributed ledger D1, and performing the analysis processing using analysis mechanisms and data accumulated in the external system 5 for each of organizations, and storing the result in the distributed ledger system 10 can also be assumed in some cases. In this case, since the data and processing contents used in each organization are black boxes, deviations or irregularities can be assumed to appear in the results.

The data linkage management technology of the present embodiment may apply to any of the above cases. The technique of the present embodiment is particularly effective in cases where all of the following apply.

Applicable condition 1: Registering the (data processed) results via the external system 5 into the distributed ledger system 10

Applicable condition 2: Wanting to register a plurality of data entries acquired and processed by each organization as one entry.

Applicable condition 3: Determining data within a certain range does not present any obstacles or problems even if the data does not match completely (degree of importance is safety (fraud prevention/reliability)>> error).

Network Configuration Example

The configuration of the computer system of the first embodiment is hereinafter described while referring to FIG. 1. The computer system according to FIG. 1 includes one or more units of a distributed ledger node 3, one or more units of a client node 4, and an external system 5 (non-distributed ledger). These devices are all coupled to a network 1 by way of a physical communication line 2.

These distributed ledger nodes 3 include a consensus manager 31, a smart contract execution/manager 32 (hereafter, called SC execution/manager 32), a member manager 33, a transaction manager 34, a transaction issuer 35, an approved transaction distributer 36, a network protocol portion 37, a distributed ledger D1, a configuration information D2, and participant member management information D3.

The distributed ledger nodes 3 receive the TX by way of the transaction manager 34 function, and form a consensus among other nodes on whether to accept the TX or not by using the function of the consensus manager 31. Then, when a consensus is formed, the distributed ledger nodes 3 deploy the SC and execute the deployed SC by way of the SC execution/manager 32. The TX history and its execution results are recorded in the distributed ledger D1.

Here, consensus forming and SC execution do not necessarily require all of the distributed ledger nodes 3, and may be performed between a portion of the distributed ledger nodes and the results are distributed to other nodes. (That arrangement may also depend on a consensus forming algorithm.)

The approved transaction distributer 36 provides a function to distribute the results (specifically, the TX history and execution results) to the distributed ledger nodes 3 that do not take part in forming the consensus or executing SC.

Here, the network protocol portion 37 provides a function to communicate between the distributed ledger nodes 3 for communication such as distributing the approved TX or forming consensus among the distributed ledger nodes 3.

The transaction manager 34 of the distributed ledger nodes 3 provides a TX acceptance function/interface, and a TX history information acquisition and browsing function/interface to meet requests from each node such as the client node 4.

In this embodiment, the distributed ledger nodes 3 are capable of issuing a TX and each type of TX is issued by way of the transaction issuer 35.

The member manager 33 of the distributed ledger node 3 provides a new issue and authentication function for members participating in the distributed ledger network (distributed ledger system). The member manager 33 assumes that a private key and public key pair are used to authenticate participating organizations and members belonging to the organization, sign the TX, and manage SC execution authority, etc. The key information relating to such member management is managed and stored in the participant member management information D3.

Further, when receiving the TX, the transaction manager 34 verifies whether or not the TX issuer is an authorized genuine participant by using the member manager 33 function as needed. However, since these functions are already known, a detailed description is omitted.

Note that the configuration information D2 stores and manages information regarding the organizations of the distributed ledger network and the members (including nodes, administrators, users, etc.) belonging to the organization. The present embodiment assumes that this information is managed by the functions of the distributed ledger node 3 (for example, the member manager 33 and the network protocol portion 37) and is held by each node.

The ledger information relating to the business-related SC (hereinafter referred to as business SC_D11) and the SC relating to the data linkage with the external system 5 (hereinafter referred to as data linkage SC_D12) are managed and stored in the distributed ledger D1.

In the data structure in this embodiment, it is assumed that BC is the TX history and that state information based on the TX execution results is held in on the table. In the internal table, it is assumed that the value is held as a Key-Value pair.

The client node 4 on the other hand includes a transaction issuer 35, a business application 41, an external system linkage portion 42, an external linkage agent 43, and an event receiver 44.

The user or provider of the SC issues each TX by way of the transaction issuer 35 of the client node 4 and sends it to the distributed ledger node 3. The assigning of issuer information to the TX utilizes approval information (private key) that is issued by the participant member management information D3.

The business application 41 is an application that executes and manages the business processing by issuing the TX relating to business SC_D11 by way of the transaction issuer 35.

The external system linkage portion 42 accesses the external system 5 by way of the external system API 51 and performs processing and data acquisition by using the external system 5. The external system linkage portion 42 issues a TX regarding data linkage SC_D12 by using the results of above processing and data acquisition by way of the transaction issuer 35. Data linkage is in this way achieved between the external system 5 and the distributed ledger system 10.

The external system linkage portion 42 is utilized by the business application 41 and the external linkage agent 43. The external linkage agent 43 receives the linkage processing event from the distributed ledger node 3 by way of the event receiver 44 and performs data linkage by way of the external system linkage portion 42 in compliance with the event. The client node 4 do not have to include functions (external system linkage portion 42, external linkage agent 43, and event receiver 44) relating to the external system 5 according to the role of the organization.

The description of the present embodiment assumes there is a plurality of distributed ledger nodes 3, and each of the distributed ledger nodes 3 is managed by a plurality of entities (e.g., a plurality of operators, a plurality of organizations, and a plurality of vendors).

In the same way, the description also assumes there is a plurality of client nodes 4, and a plurality of SC users respectively utilizes separate client nodes 4. The client nodes 4 can also be jointly used by a plurality of SC users by switching the approval information assigned to the TX to each user.

Hardware Configuration

Figure 2:
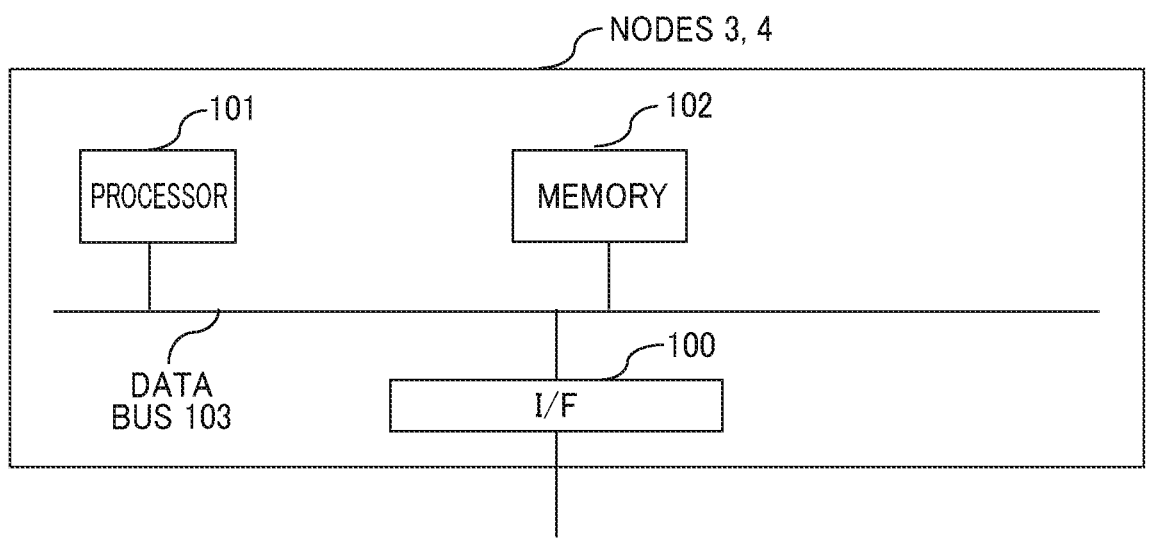
FIG. 2 is a block diagram showing a physical configuration example of a node of the first embodiment.

FIG. 2 is a block diagram showing a physical configuration example of a distributed ledger node 3 or a client node 4 of the first embodiment. The description here gives an example utilizing the distributed ledger node 3.

The distributed ledger node 3 is a calculator including an interface (I/F) 100, a processor 101, and a memory 102. The interface (I/F) 100, the processor 101, and the memory 102 are coupled by way of a data bus 103.

The distributed ledger node 3 communicates with the network 1 by way of the I/F 100. Also, the processor 101 is an arithmetic device such as a CPU. The memory 102 is a storage area holding programs and data.

The processor 101 executes the program read out from the memory 102 by way of the data bus 103 and installs the required functions. The functions are applicable to the consensus manager 31 through the network controller 37.

Data Configuration Example

Figure 3A:
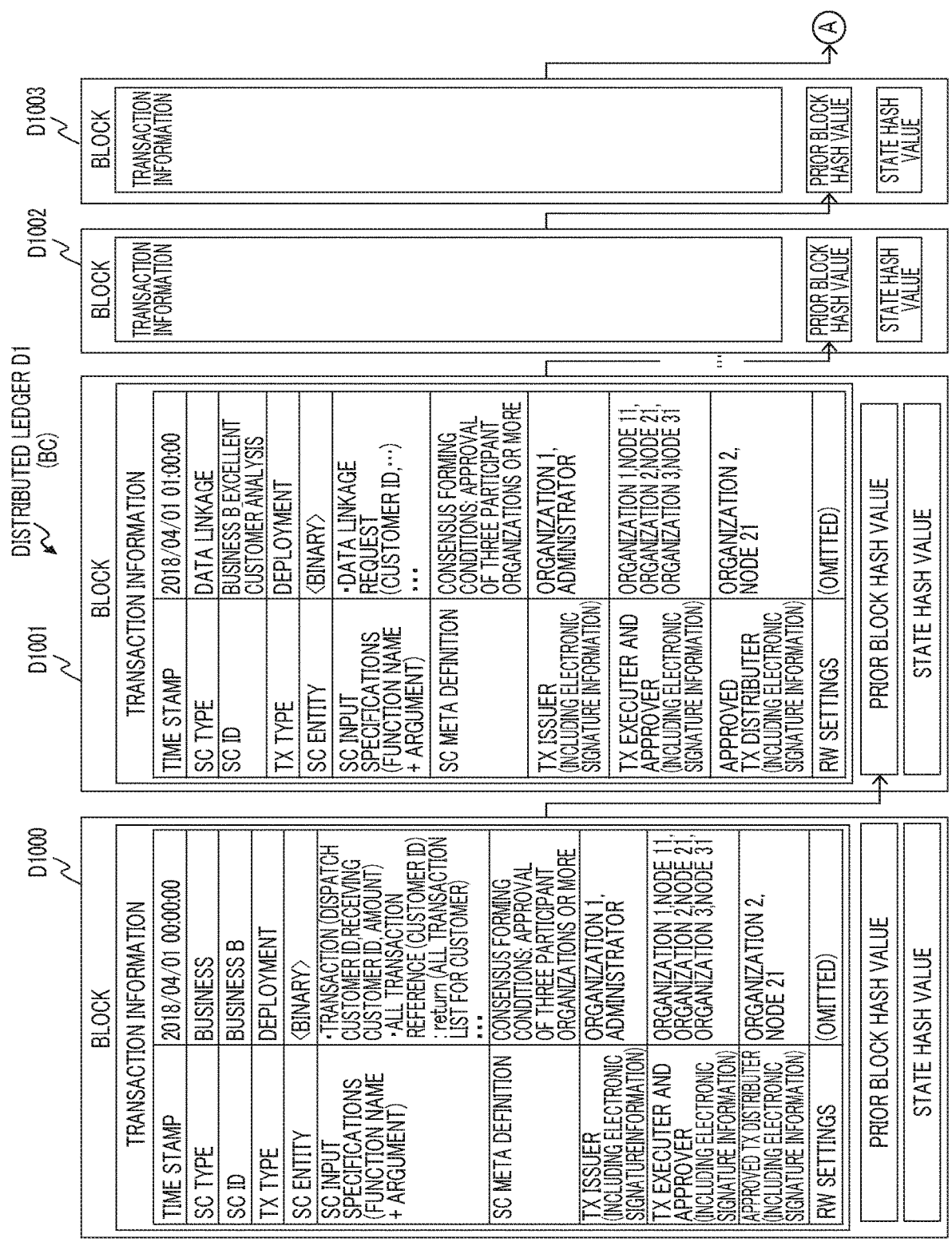
FIG. 3A is drawings showing a data structure example of the blockchain in the distributed ledger.
Figure 3B:
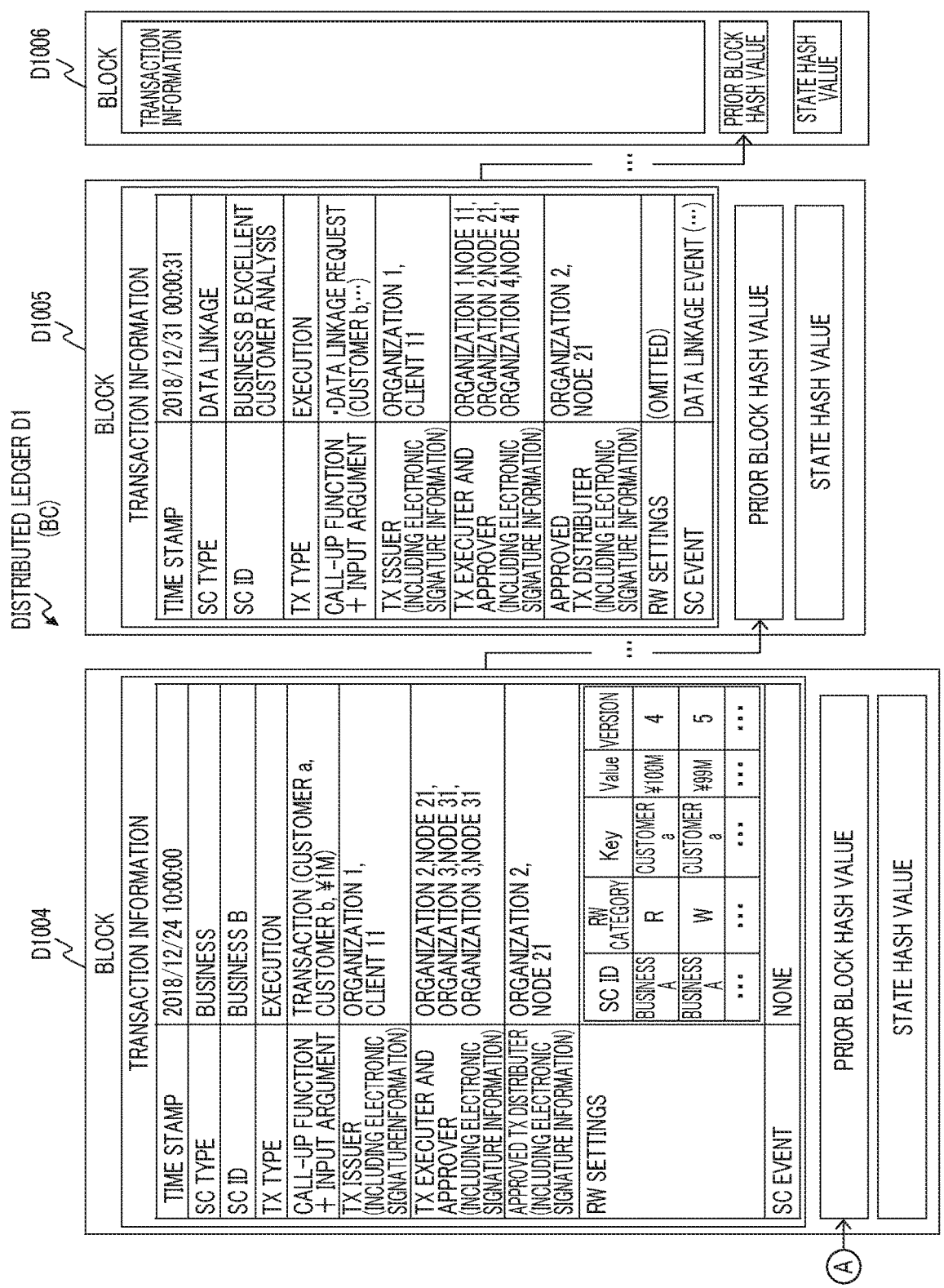
FIG. 3B is drawings showing a data structure example of the blockchain in the distributed ledger.
Figure 4:
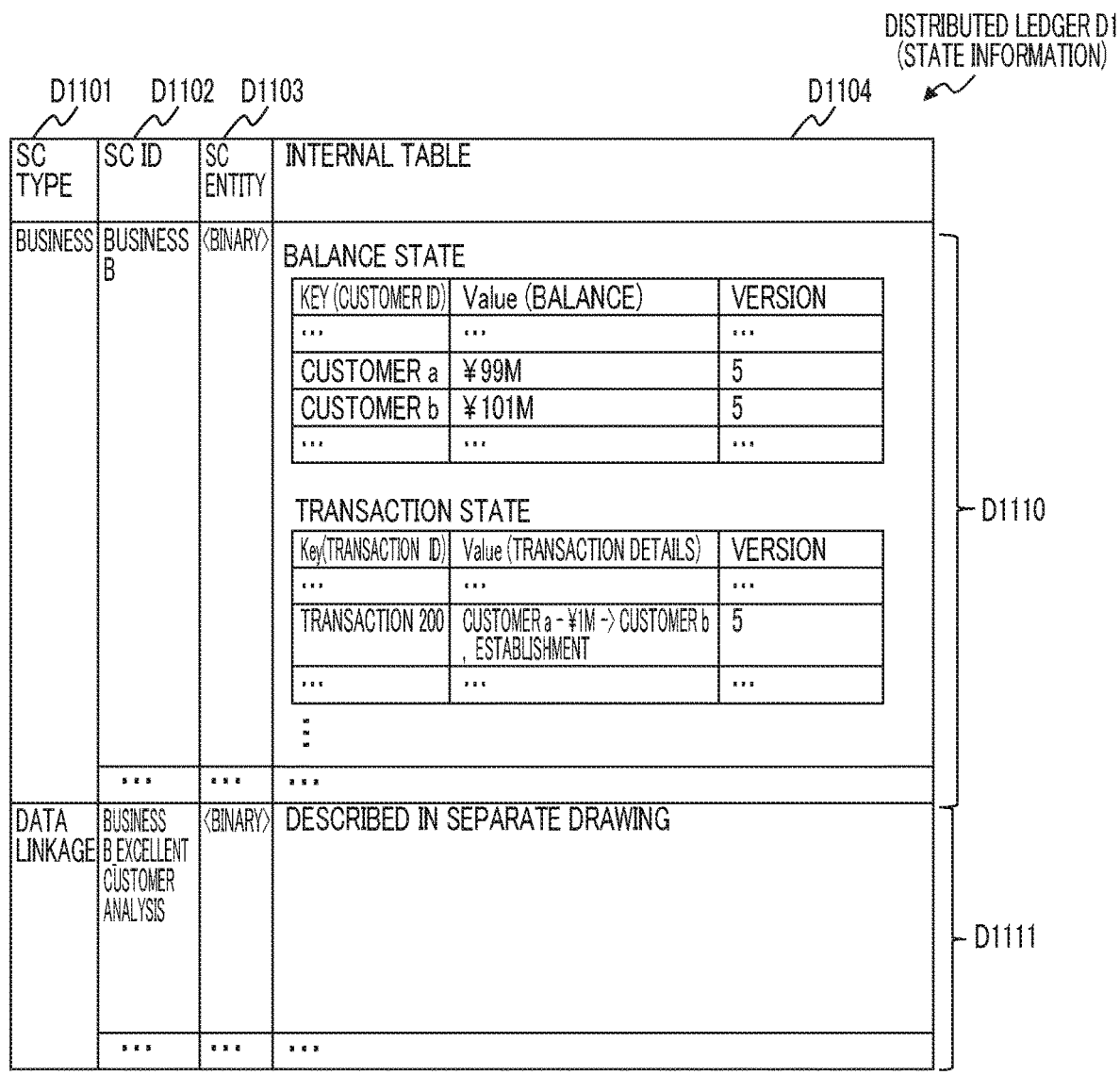
FIG. 4 is a drawing showing a data structure example of state information in the distributed ledger.

FIGS. 3A, 3B and 4 are drawings showing an example of the data structure stored in the distributed ledger D1. Each of FIGS. 3A and 3B is an example of BC that is one of the data structures managed on the distributed ledger D1.

In the distributed ledger management using BC, a plurality of TX are gathered into blocks, and each block holds the hash value of the preceding block so that the data is managed in a string. If the value in the preceding block changes by even one bit, the hash values of all subsequent blocks change so that tampering is virtually impossible.

To simplify the description for the present embodiment, one block represents one TX. However, the description is also valid for the case where a plurality of TX is stored together in one block.

Also in the example in the present embodiment, each SC (D11 to D12) links as a single BC, however if the participating organizations are each capable of processing and retrieval, a separate BC itself is allowable. Conversely, each SC links separately, however if each SC is set with identical functions, these may be defined within the same SC.

In FIGS. 3A, 3B, D1000 through D1006 are a chain of consecutive blocks. Each block includes any of TX information for deploying and executing the business SC, and deploying and executing the data linkage SC. Each block includes the hash value of the preceding block and includes a hash value that is generated from the subsequent state information.

In the above described data configuration, the TX history of each block for deploying and executing the business SC, and deploying and executing the data linkage SC is managed as a data chain in the BC.

D1000 among the above described blocks is one example of a block storing the deployment TX for the business SC. In this example, "business B" indicates an example of a business contract relating to commercial transactions (virtual currency transactions) at a plurality of companies and organizations.

The deployment TX of the present embodiment includes a time stamp when the TX is issued, an SC type that identifies whether the SC is a business or data linkage, an SC_ID that uniquely identifies the SC, and a TX type that identifies whether the TX is a deployment or an execution, and an SC entity (e.g., executable binaries). The deployment TX also includes SC input specifications for allowing the user to know the function name and arguments held by the SC.

Further, the deployment TX includes an SC meta definition which is a parameter (e.g., consensus forming conditions during execution of the SC [example: accepting a TX having approval for three or more organizations] or each type of defined information) chosen according to the specified input arguments during deployment.

Such TX includes information on the issuer of the TX. Information on the issuer of the TX includes the electronic signature information verifying there is no tampering in the member ID information of the issuer, the issue source, and data.

The electronic signature is generated by using the private key of the network participating member (namely, the SC provider or user) that is issued by the member manager 33 and the verification of the generated electronic signature can be performed by using the public key that is one of the key pair.

The same as for information on the TX issuer, this TX information includes information on the TX executer and approver (in other words, information on participants relating to SC execution processing as well as consensus forming by making use of the consensus manager 31 and the SC execution/manager 32) and information on the approved TX distributor (in other words, information on participants relating to delivery processing by the approved transaction distributer 36).

Further, this TX information also includes information on the Read-Write (RW) set serving as the state information for reading and writing in this transaction. The RW setting is described in detail in the execution TX described below. Here, the function held by the SC is subsequently called the SC function.

The SC deployed in D1000 among the BC in FIG. 3A is provided by the "administrator" of the organization "Org1" set as SC_ID "business B" and is defined at least by the following SC function.

Function name: transaction ( ) input argument: dispatch customer ID, dispatch customer ID, remittance amount, return value: pass-fail Function name: see all transactions ( ) input argument: customer ID, return value: all transaction list for specified customer On the other hand, D1004 among the BC in FIG. 3B is an example of a block storing the execution TX of a business SC. The execution TX of the present embodiment is basically the same as the deployment TX but includes, instead of the SC entity or SC input specifications, information on the call-up SC function name and the argument to input.

In the example of the present embodiment, "Execute" is specified for TX execution including update of distributed ledger D1 and "Read" is specified for reference processing that does not update the distributed ledger D1.

The TX for the above described D1004 shows an example for carrying out an execution request that specifies "Business B" in SC_ID, and specifies an input argument "customer a, customer b, ¥1M" in the SC function "transaction ( )". Namely, the TX is an example of calling up the SC that is shown in D1000.

RW setting shows state information read or written by deploying or executing an SC (function), and includes information on the SC_ID, the "RW category" that identifies "Read" or "Write", and the "Key" and the "Value" as the target state information.

The RW setting further shows information on the update version number of this Value. The version number is managed by each Key for the SC_ID, and is incremented by one for each update (write).

In the example in D1004, in the process for executing the function call up "Register (customer a, customer b, ¥1M)", the Value "¥100M" for version number "4" in reference to Key "Customer a" is acquired (first line), the Value "¥99M" is written, and the version number is updated to "5" as a result.

By managing and holding the execution results of the TX as the RW setting in this way, the execution results can be found without executing the SC, the SC execution results can be shared even for nodes where the SC is not executed so that the processing is efficiently performed.

The block D1001 and block D1005 are examples of blocks storing a deployment TX and the execution TX for the data linkage SC. As the general framework for a data configuration, the deployment TX and the execution TX for the data linkage SC of the present embodiment include the same information as the same TX in the business SC.

Here, the only difference assumed is simply whether an SC related to business or an SC related to data linkage processing with the external system 5 is described. The present invention can therefore be implemented as an outside function without internally modifying the distributed ledger system 10 (in particular, each of functions 31 to 37 of the distributed ledger node 3).

FIG. 4 is a configuration example of state information that is managed in the distributed ledger D1. In the distributed ledger management using BC, acquiring the (latest) state (for example, the remaining balance of an account in the case of virtual currency) normally requires retracing the BC tasks. Doing so lowers the processing efficiency so instead of using BC a method is available to cache the latest state information ("Hyperledger Fabric", [online] [Retrieved Mar. 31, 2017], Internet<URL: https://hyperledger-fabric.readthedocs.io/en/latest/>, etc.).

Holding of the latest state information is assumed also in the present embodiment. In the present embodiment, a data area for the state in each SC is available. The state information holds the SC_ID and the entity of the SC. The SC execution/manager 32 is in this way capable of acquiring and executing the SC entity using the SC_ID as the key.

Further, the state information includes an internal table D1104 for holding execution results. The contents of the internal table D1104 are updated each time a TX is executed. Information on each SC such as the business SC and the data linkage SC regarding the state information is also stored.

Here, examining the internal table D1104 in D1110 reveals that the latest state held in the D1110 reflects all of the RW settings corresponding to the target RW setting described in FIGS. 3A, 3B. In the typical implementation example, the data is held in this type of Key-Value format, however data configured in formats such as JavaScript Object Notation (JSON) format may also be stored in the value. Data can in this way be held in an optional data schemer table.

Devising a suitable key design allows virtually managing the plurality of tables (different schemer information) within the internal table. The internal table relating to subsequently described data linkage expresses the case for storing data configured in Value, and omits a Key-Value version description in order to simplify the description.

Also in the distributed ledger system, a function can be provided to notify each participating organization (the distributed ledger node 3 and the client node 4) when an event is issued at the adding of a TX to the distributed ledger D1. Each participating organization can also act according to such type of events The SC event contained in the TX information in FIGS. 3A, 3B is event information issued when utilizing such type of distributed ledger event management functions.

Figure 5:
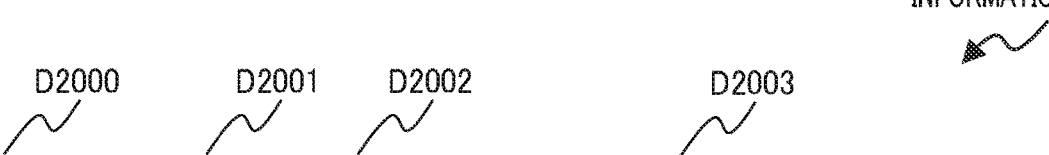
FIG. 5 is a drawing showing a data structure example of the configuration information.

Next, FIG. 5 is a drawing showing a data configuration example for the configuration information D2. This configuration information D2 stores information on organizations configuring the distributed ledger network and members belonging to those organizations (including distributed ledger node 3, client 4, administrator, and user, etc.).

Among these elements, business D2000 is a group that performs specific tasks within the distributed ledger network. The organization ID_D2001 shows the organizations participating in the distributed ledger network (and business). Also, the member ID_D2002 is information for identifying members within the participating organizations. More specifically, the information is for identifying the administrator, the distributed ledger node 3, the client node 4, and the user.

In the configuration information example, there are "business A" and "business B" as the business. "Organization 1", "organization 2", "organization 3", and "organization a" contained in the "business B", and "organization 3" and "organization 4" contained in the "business A" indicate at least the participating network status.

The organizations need not include the network ledger node 3 and in some cases may utilize only the distributed ledger network system 10 by way of the client node 4.

Also, the external system access rights D2003 is the access rights for data linkage with the external system 5.

In the present example, in "business B", the "organization 1" and "organization 2" have administrator access rights; and "organization 3" has ordinary user access rights. However, "organization a" has no access rights. Consequently, direct access to external data is impossible for "organization a". Therefore, when data is required via the external system 5, the "organization a" must request a data linkage to another organization.

Figure 6:
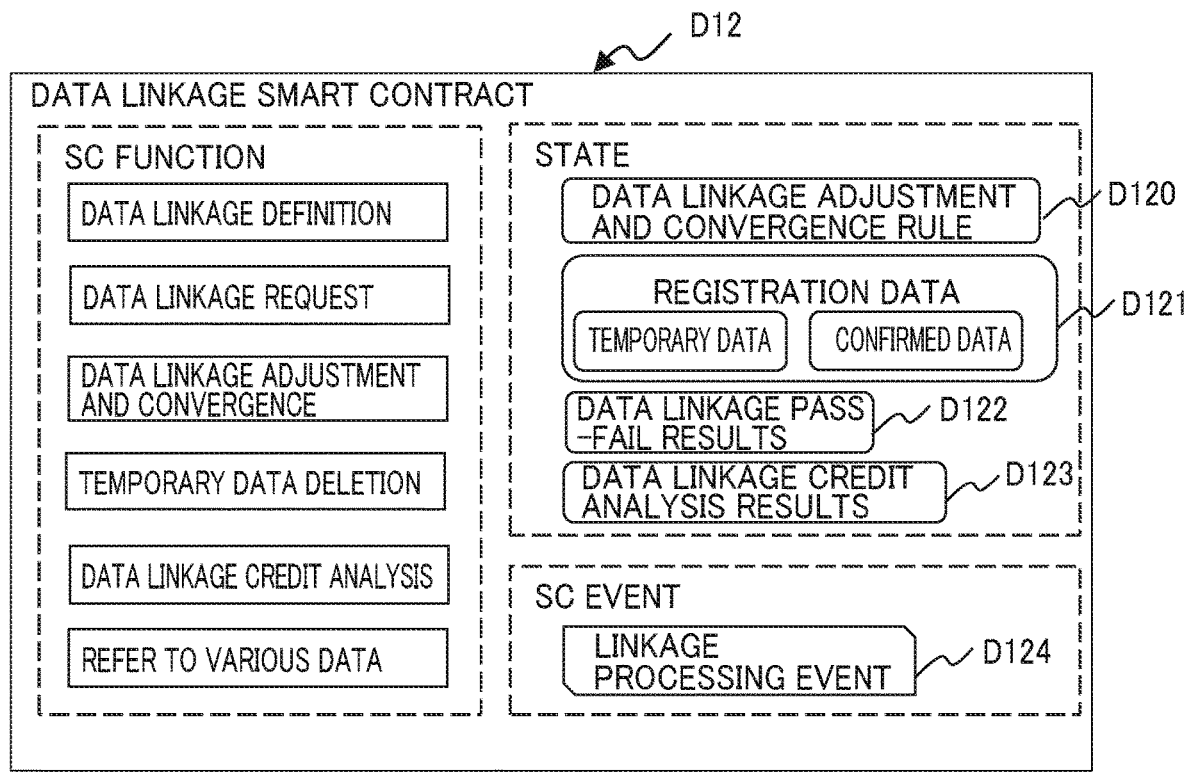
FIG. 6 is a drawing showing a data structure and processing content of a data linkage SC.

FIG. 6 is a drawing showing an example of the data configuration of data linkage SC_D12 and the SC function.

This data configuration is managed and held as the state information. Also, as the rules relating to data linkage, the data linkage adjustment and convergence rules D120 is described in the data structure in the data linkage SC_D12.

Also, the register data D121 is managed as data registered by way of the external system 5. Temporary data from each organization prior to adjustment and convergence processing, and confirmed data with unique values verified by adjustment and convergence processing are managed in the register data D121. The data linkage pass-fail result D122 and the data linkage credit analysis results D123 are only used in the third embodiment so their details are described below.

The linkage processing event D124 is an SC event that is issued during the linkage request within the data linkage SC_D12. This linkage processing event D124 is utilized for notifying the external linkage agent 43 of the linkage processing when performing external system linkage processing by way of the external linkage agent. The respective data structures are described below in detail.

Also, an SC function serving as a main function of the present invention, defines a "data linkage request" for requesting external data linkage processing; and a "data linkage adjustment and convergence" for confirming the results in a single entry by converging data entries from the plurality of organizations according to data linkage adjustment and convergence rules after registering the results carried out of data linkage processing by each organization with the external system 5 for the data linkage request.

Though depending on the implementation and linkage method, "data linkage request" and "data linkage adjustment and convergence" may be integrated into a single SC function.

Further, the SC function also contains a "data linkage definition" for defining the data linkage adjustment and convergence rule D120 and reference functions for acquiring and retrieving various data.

Here, "Temporary data deletion" is a function for deleting temporary data that is no longer necessary after registration data is confirmed. Temporary data deletion is only utilized in the second embodiment.

Also, "data linkage credit analysis" is a function for calculating the degree of trustworthiness of each organization related to data linkage processing and is used only in the third embodiment.

The specific flow of the SC functions "data linkage request" and "data adjustment and convergence" will be described below using a flowchart.

Next, FIG. 7A is a drawing showing a data structure example of data linkage adjustment and convergence rule D120 that is managed within the data linkage SC. The data structure of the data linkage adjustment and convergence rule D120 that is shown in the drawing assumes a management state within the internal table D1104 of D1111 (state information in FIG. 4).

In the present embodiment, the data linkage adjustment and convergence rule D120 linked to the business (business SC) is defined in a plurality of states according to the business SC and its state type.

In the present embodiment, the state of the same business SC and data linkage SC are set to allow mutual reference and utilization. Also, to make the table description easier, data corresponding to a plurality of business SC (plurality of linkage SC) is recorded on the single table, however in actual use may be separated by SC. The data structure in the figures from here onwards is the same.

The SC_ID (D12000) column is information for identifying target SC. In the present embodiment, this designation also serves as a business designation. This designation may for example be described in a "business SC_ID+ underbar+ processing name in external system" format.

Also, the state type D12001 is information showing state information serving as the target. The consensus standard D12003 is a condition for accepting and confirming the external system processing results (temporary data) that are acquired from each organization at the consortium. This consensus standard D12003 includes the number of organizations D12004 and the tolerance range D12005 in the present embodiment.

The number of organizations D12004 shows the number of organizations performing external system linkage processing that is required for consensus. The consensus standards for the number of organizations are satisfied if the linkage processing results from organizations satisfying this condition are registered.

The tolerance range D12005 is a tolerance range for external linkage data width entered from the plurality of organizations. The consensus standards for the tolerance range are satisfied when all temporary data satisfies this condition.

The convergence method D12006 is a calculation and aggregation method for values for confirming external linkage data entered from the plurality of organizations in a single entry.

Each of the above described D12004 to D12006 columns is recorded in a text base in order to simplify the description in the present embodiment, however this processing assumes actual recording is in a data structure such as JSON, etc. When more complicated processing is required, the data may be recorded by way of a program code according a programming language utilized for recording of SC or a Domain Specific Language (DSL).

The processing organization select method D12007 is a method for selecting the processing organization to request for linkage processing with the external system 5 to handle a data linkage request. In the present embodiment, the organization capable of linkage processing with the external system 5 is extracted based on the business D2000 and the external system access right D2003 while referring to the configuration information D2, and the organization is selected from among the extracted organizations by the method recorded in the processing organization select method D12007.

The selection methods from organizations capable of linkage processing in this case may include "random selection", "sequential selection", "all organization selection" or "trustworthy priority selection" that gives priority to organizations that are highly trustworthy, etc.

The processing organization select method D12007 needs not be utilized when the execution and approval organization requesting consensus forming for the execution TX can be the same as the processing organization.

The data acquisition method D12008 shows a method that performs processing by way of the external system 5 and acquires the processing results. The data acquisition method D12008 of the present embodiment includes an information D12009 showing whether to acquire data from within the SC or perform acquisition by way of an agent; and a data acquisition processing D12010 as a specific processing content. Among these, the information D12009 is information showing whether to perform processing and data acquisition via the external system 5 within the SC or via an external linkage agent.

The data acquisition processing D12010 is information recording the specific processing content as reference information, and the details are described in FIGS. 7B and 7C.

In this case, the step ID (D12011) is a number utilized when the processing on the external system 5 has a plurality of procedures.

The external processing ID (D12012) is a label for the name of the external processing.

The target D12013 is information showing the target processing system and is utilized when there is a plurality of (external) systems that should be processed and referenced by single linkage processing.

The category D12014 is information for identifying the method to access data from the external system 5. The external linkage agent 43 switches the data access method based on this information.

The input D12015 is information serving as input for the processing in the step.

The processing D12016 is the specific processing in the step using the external system 5; and the output D12017 is the output that must be acquired.

The processing D12016 provides URL of the access destination API and command-like expressions, and the description enclosed by the { } expresses the parameter (argument) substituted by input or environmental variables. The description in the processing D12016 may be expressed in a complicated manner such as by a command string/shell script, DSL, or a programming language if capable of being handled on the agent side or within the SC.

The present embodiment shows examples of the external linkage processing given in detail such as the input, processing, and output, however, these items may be managed on the external linkage agent 43 side without holding such detailed information on the data linkage adjustment and convergence rules D120.

Recording the specific data acquisition processing as shown in the present embodiment has the advantage that linkage processing is uniform among the plurality of organizations. On the other hand, managing the details on the agent side offers the advantage that external system linkage processing can be flexibly performed.

Here, a specific example is described for the data linkage adjustment and convergence rules D120. The line D12020 in FIG. 7A, and D12020-1 in FIG. 7B are rules recording the data linkage method for the state information "user utilization" in the external system linkage process "metering" of a business (SC) "business A".

In this example, the consensus standards for a data linkage request are satisfied if the data serving as the external system linkage results are registered from "total 3 organizations or more" and also the range of the plurality of entry data fits within a range "within time of ±3 seconds" and a "value within +5%". Data convergence methods satisfying these consensus standards are adjustment and convergence methods confirming the data by way of the "maximum value of data entered for the time" and "average value of data entered for the value".

Also, the processing organization select method D12007 performs "sequential processing" to make a request to each processing organization by way of an "agent". In the data acquisition process of a single step, just as is recorded in line D12020-1, "REST" in the target "service 1" of external system 5 is accessed for external processing "data acquisition"; and "user ID" information acquired from the request TX is input, the "URL" "{API URL}/meter/user/{user name}" is accessed and acquires data. The output results are recorded in the data linkage SC (data adjustment and convergence request from each organization).

In one more example, the D12021 and D12021-1, 2 are rules recording data linkage methods for "customer score" state information in "excellent customer analysis" external system linkage processing for the previously described business (SC) "business B".

In the present example, the consensus standards for a data linkage request are satisfied if the data serving as the external system linkage results are registered from "total 3 organizations or more" and also the range of the plurality of entry data fits within a range "within time of ±10 seconds" and a "value within ±3%". Data convergence methods satisfying these consensus standards are adjustment and convergence methods confirming the data by way of the "maximum value of data entered for the time" and "minimum value of data entered for the value".

The processing organization select method also performs "random selection" and makes a request to each organization via the "agent". The data acquisition processing is two steps just as described in lines D12020-1, 2.

First of all, as the "data loading" process in step 1, the distributed ledger system 10 is accessed on the external linkage agent 43 side, and all transaction reference functions of business B (SC) are called up with the customer ID as the key, and the customer total transaction list which is the analysis data is loaded to each local processing organization.

Further, as the "customer analysis command execute" process in step 2, the "customer_analysis" command is called up and analysis is performed by the external system "analysis application" with the output results from step 1 as the argument, and those results are registered in the data linkage SC (data adjustment and convergence request from each organization).

Examples of the convergence method are expressed as simplified statistical processing content such as "Average" "Maximum" "Minimum", however if able to convert into unique data during convergence processing, then more complicated aggregate function or variable processing may be utilized. Judgement conditions for the tolerance range are also the same.

The data linkage adjustment and convergence rules D120 are assumed as consulted upon beforehand among the distributed ledger network participants and deployed. The data linkage adjustment and convergence rules D120 can be updated upon mutual consultation by the participants at any time. The specific process for the data linkage adjustment and convergence rules D120 are described in detail in flowcharts below.

Next, the data structure example for registration data D121 managed within the data linkage SC_D12 is shown in FIG. 8. The data structure example shown in the figure is assumed as the state managed within the internal table D1104 of D1111 (See FIG. 4).

Here, both the temporary data from the plurality of organizations before convergence processing and the confirmation data after convergence processing for the data linkage request are assumed to be managed and registered.

The columns D12100 through D12101 are the SC_ID and state type for identifying the data linkage target; and correspond to the columns D12000 through D12001 of the data linkage adjustment and convergence rules D120.

The state ID_D12102 is the specific key corresponding to the state type D12101 and for example in line D12124, shows the data for the "customer b" of "customer score".

The request ID_D12103 is an identifier for uniquely identifying the data linkage request for the data linkage adjustment and convergence rules D120. In this embodiment, the request ID_D12103 is assumed as indexed by the client or the processing within the SC (for example, may jointly use the TX_ID issued by the distributed ledger node 3).

The management status D12104 is information for identifying whether this data is the temporary data or the confirmed data.

Also the registered organization D12106 is information for the organization that registered this data. In the case of the confirmed data, information on the plurality of organizations that registered the temporary data is recorded.

The time D12105 and the value D12107 are information on the time and value of this data.

Also, the external processing evidence D12108 is results from external system linkage processing by each organization. More specifically, the results are assumed as an external processing call-up history and an execution result history for each organization according to the data acquisition processing D12010.

The evidence need not be registered however the registered information proves useful for verifying and confirming whether the processing by each organization by way of the external system 5 has been executed as desired.

The lines D12120 through D12123 are examples of registered data for which data linkage is performed according to line D12020. Lines D12120 through D12122 are temporary data from each organization, and line D12123 is confirmed data.

In the same way, lines D12124 through D12127 are examples of the registered data for which data linkage is performed according to line D12021. Lines D12124 through D12126 are temporary data from each organization, and line D12127 is confirmed data.

Next, FIG. 9 shows a data structure example of the linkage processing event D124 issued within the data linkage SC_D12. This data is only utilized for performing external system linkage processing by way of the external linkage agent.

The linkage processing event D124 is recorded in a table format to prevent redundancy in the descriptions of the drawings, however for each actual data linkage request, each line is assumed to be embedded in a block as a single SC event and notified to each organization.

Columns D12400 through D12403 in the figure are respectively the same as columns D12100 through D12103.

Also, the process supervisory organization D12404 is the organization chosen to supervise the processing as a result from the data linkage request. By referring to this information, each agent can judge whether or not own organization must execute processing.

Also, the input D12405 is input information for this data linkage request. The example in line D12421 shows an example of input of "customer b" in the variable "customer ID". The data acquisition processing D12406 column is the same information as D12010, and is embedded while referring to D12010.

Member Registration

The actual procedures for the data linkage management method in the present embodiment are described hereafter based on the drawings. Each type of operation corresponding to the data linkage management method described hereafter is implemented by a program that is read out in a memory etc. and executed by the nodes (distributed ledger nodes 3, client nodes 4) configuring the data linkage management system 10. The program is configured from codes for performing each type of operation described hereafter.

Figure 10:
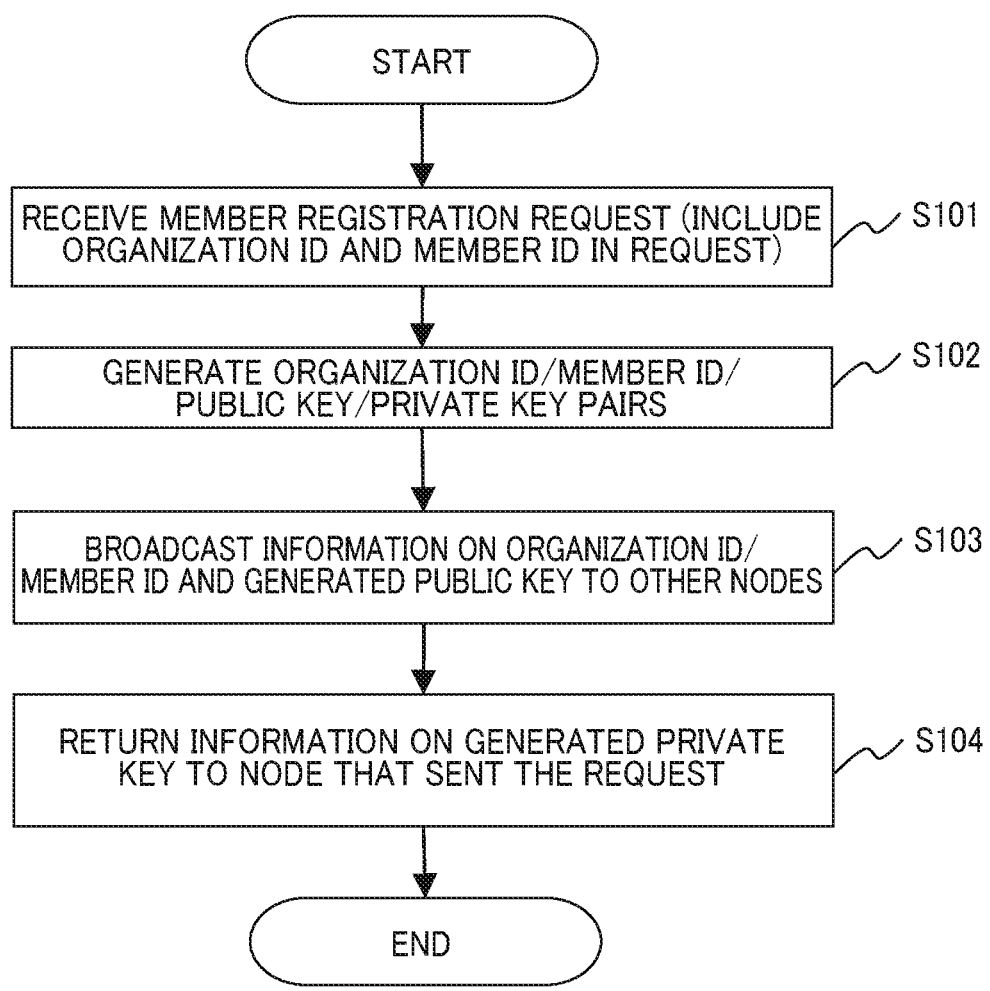
FIG. 10 is a flow chart showing an example of a new registration processing for a member to participate in a distributed ledger network.

The processing flow in the first embodiment is described next. FIG. 10 is a flow chart showing an example of the new registration processing for a member to participate in the distributed ledger network.

In this case the member manager 33 of the distributed ledger node 3 accepts member registration requests from other nodes such as the client node 4 (step S101). Here, the above described member registration request includes a member ID to uniquely identify the requesting member.

Subsequently, the member manager 33 generates a private key D31 and public key D32 pair from the already known general technique and the keys are linked to the member ID accepted in S101 (step S102).

Next, the member manager 33 broadcasts the member ID for the new registration target and the public key D32 to other nodes (step S103).

Information regarding the member ID and the public key D32 that are broadcast is stored on each node as the participant member management information D3.

Further, the member manager 33 returns the private key D31 generated in S102 for the node performing the member registration request (step S104). The node that receives the private key D31 stores it as its own private key D31 in the participant member management information D3.

In the present embodiment, the authentication for network participating member and signature for the TX, and control of SC execution rights are performed assuming utilization of the private key and public key generated as described above.

Specifically, for example, the confirmation of the person is achieved by issuing a TX with the electronic signature using an issued private key on the client node 4 side, and by verifying the electronic signature name using the public key on the verification node side such as the distributed ledger node 3.

The technique for generating the public key and private key pair and the technique for verifying the signature, and the technique for linking the key and ID may apply the commonly known or well-known technology. Therefore, no detailed description is made in the first embodiment.

Moreover, in this embodiment, the function of the member manager 33 is shown as a function of the distributed ledger node 3, however a dedicated member manager node may be established externally and that node may be provided with the same functions at the member manager 33.

Transaction Processing

Figure 11:
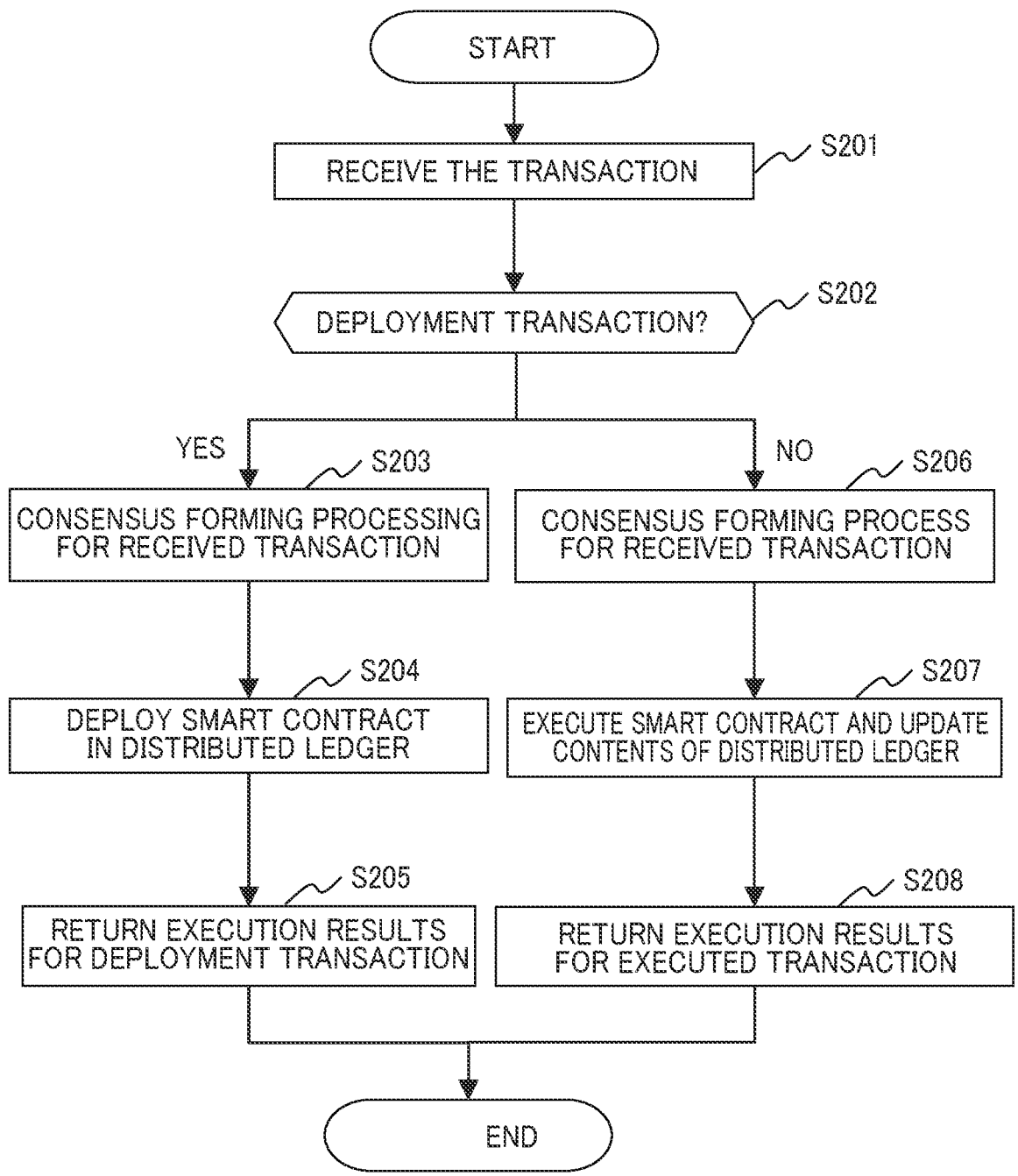
FIG. 11 is a flow chart showing an example of a transaction processing of the data linkage SC.

FIG. 11 is a flow chart showing an example of the TX execution processing or namely an example of SC deployment and execution processing. The SC types include business and data linkage, etc. However in the present embodiment, the difference in processing by SC type can be expressed as a difference in the SC internal processing and the flow of the TX execution processing itself is common in the SC.

Here, the transaction manager 34 of the distributed ledger node 3 accepts the TX from TX issuing source such as the client node 4 (step S201). The transaction manager 34 then conveys this TX to the consensus manager 31 and the SC is deployed and the processing is executed according to the type of the TX.

The case when the TX received above by the consensus manager 31 is an SC deployment TX (when judgement is YES in step S202) is described. In this case, the consensus manager 31 performs the consensus forming processing with other distributed ledger nodes 3 on whether to execute the received TX or whether to add the TX as a block to the end of the BC (step S203). A commonly known or well-known technology may be applied as the consensus forming processing method.

The employment for example of an algorithm called the Practical Byzantine Fault Tolerance (hereafter, PBFT) is being considered. This PBFT is an algorithm setting conditions for consensus on more than a fixed number of nodes (two-thirds) among all nodes (namely verification nodes) participating in forming the consensus.

As another example, the distributed ledger system described in "Hyperledger Fabric", [online] [Retrieved Mar. 31, 2017], Internet<URL: https://hyperledger-fabric.readthedocs.io/en/latest/> utilizes a consensus forming algorithm called the Endorser-Orderer model. In the Endorser-Orderer model, a portion of distribute ledger nodes 3 having authorization rights are selected from among the distributed ledger nodes 3 and a TX is sent. A verification is performed for any problems with just these selected distributed ledger nodes and if there is no problem an authorization is sent back.

If the predetermined consensus forming conditions (e.g. approval of two or more organizations) are satisfied, the TX is accepted. The approved TX is also distributed to all the distributed ledger nodes 3. The Endorser-Orderer model does not require performing a TX authentication by all the distributed ledger nodes 3 so is more efficient than the PBFT algorithm.

Here, a simple description of the flow from consensus forming onward is given using the Endorser-Orderer model as the base. The distributed ledger node 3 participates in the distributed ledger network with the accepted TX and sends it to distributed ledger nodes 3 having TX authentication rights. On the other hand, each of the distributed ledger nodes 3 that has received this TX, verifies the signature for the target TX and confirms that there is no tampering and that the contents of the target TX are genuine. The distributed ledger node 3 that has verified the TX sends back the check results to the distributed ledger node 3 that sent the above described TX. When the predetermined consensus forming conditions are satisfied, the TX authentication is complete and with this confirmation, the consensus forming is complete.

The consensus manager 31 broadcasts the authenticated TX to all distributed ledger nodes 3 using the approved transaction distributer 36 function.

The consensus manager 31 that has received this authenticated TX, registers the SC contained in the target TX into the distributed ledger D1 by way of the SC execution/manager 32 (step S204). Specifically, the consensus manager 31 registers the SC_ID and SC entity in the distributed ledger D1 as state information based on the contents of the TX, and a block containing the deployment TX is added to the end of the BC.

Finally, the consensus manager 31 sends back the execution results of the deployment TX to the TX issuing source (step S205).

The case where the accepted TX is the SC execution TX (when judgment is NO in step S202) is described. In this case also, the consensus forming processing is performed the same as for the deployment TX (step S206). This consensus forming process is the same as step S207.

When the above described consensus forming is complete, the consensus manager 31 executes the SC and updates the contents of the distributed ledger D1 by way of the SC execution/manager 32 (step S207). Specifically, execution is performed to assign a call-up function and an input argument specified in the execution TX for the SC (assuming registration is complete) holding the SC_ID specified in the execution TX.

The consensus manager 31 then updates the contents of the distributed ledger D1 based on the execution results. The consensus manager 31 updates the state information D12 relating to this SC based on the execution results and adds the execution TX as a block to the end of the BC. Finally, the consensus manager 31 returns the execution TX results (for example, return value for the function) to the TX issuing source (step S209).

External System Linkage Process

Figure 12A:
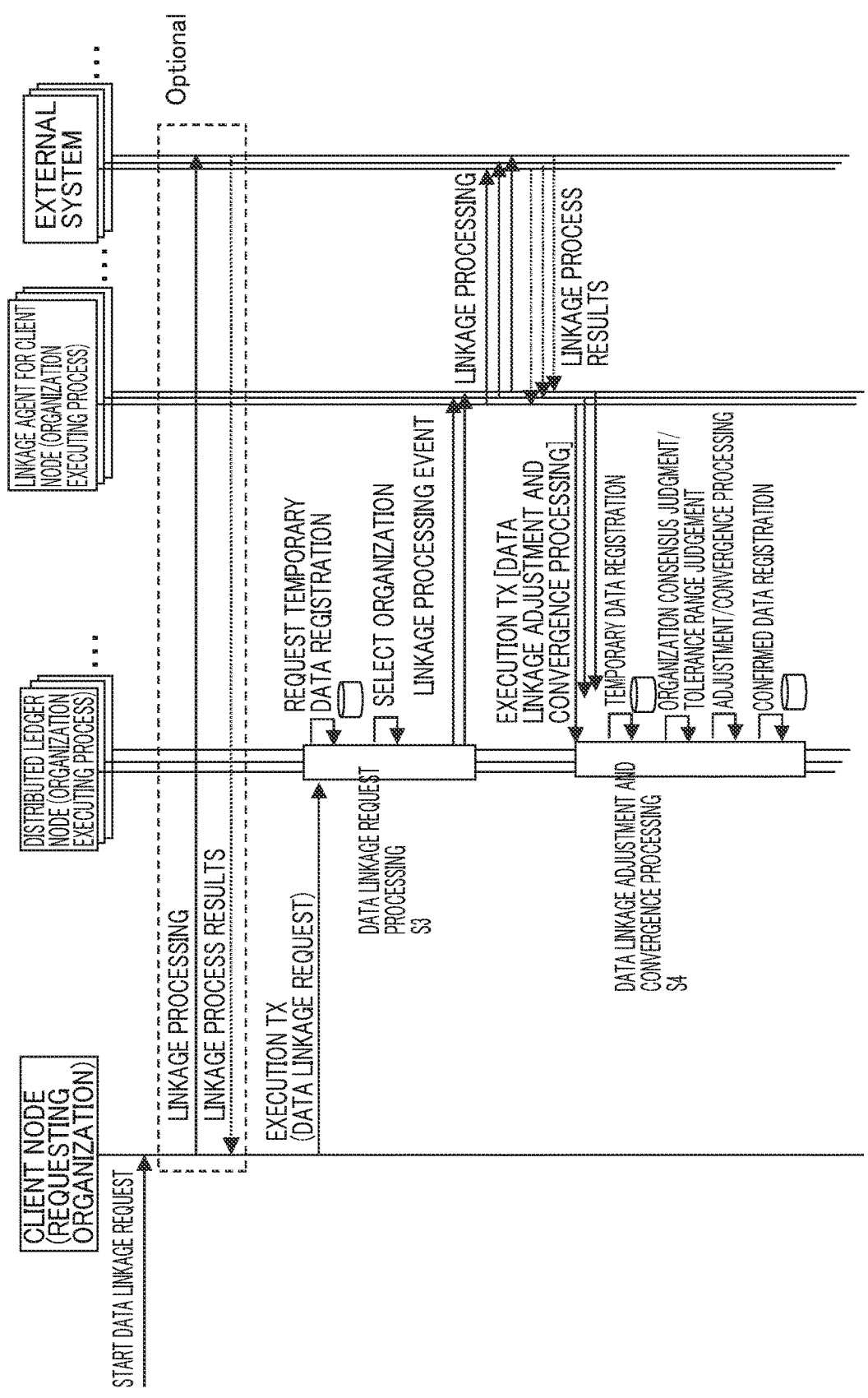
FIG. 12A is a sequence chart showing an example 1 of a data linkage processing according to the data linkage SC serving as the overall system in the first embodiment.
Figure 12B:
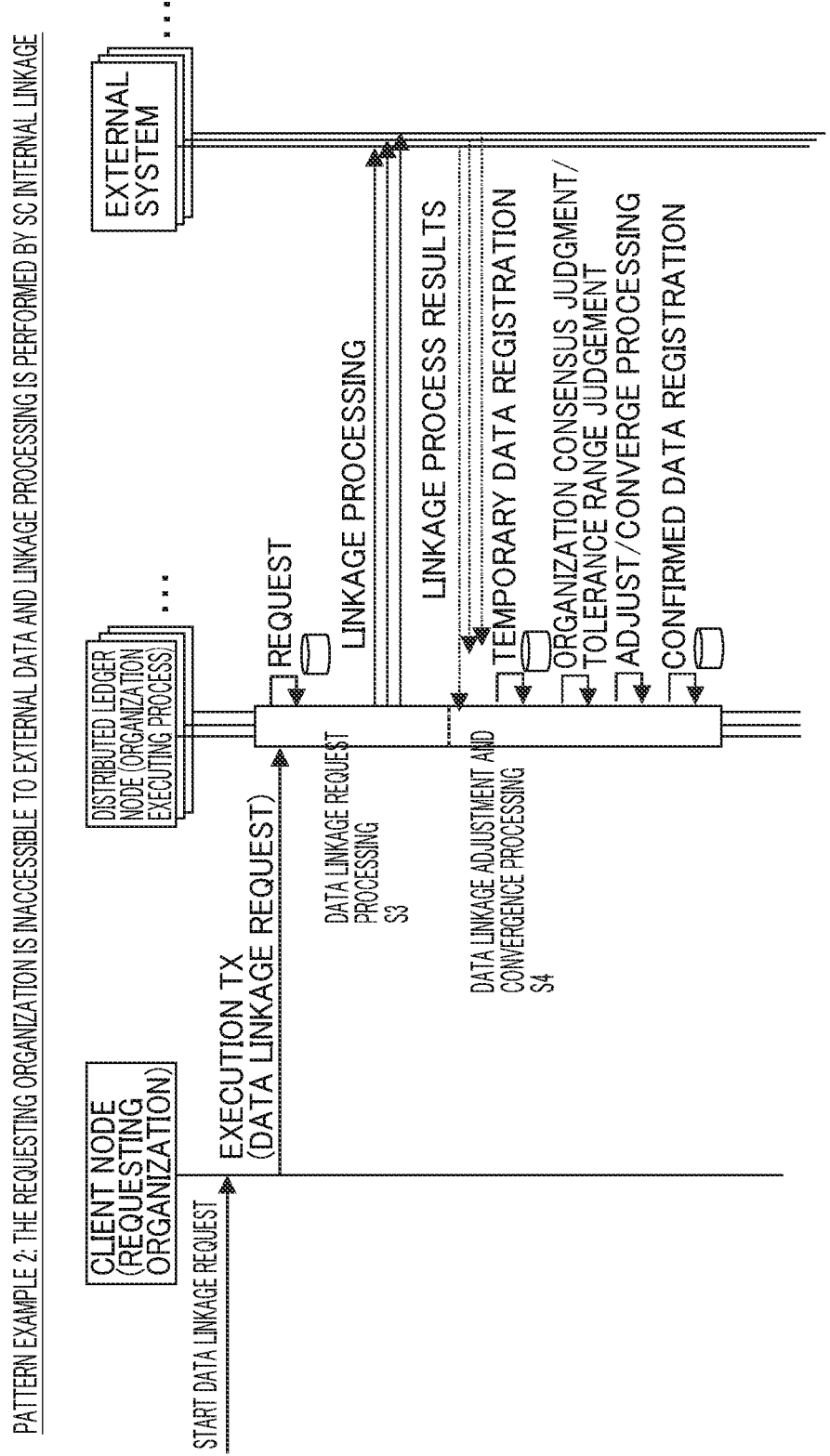
FIG. 12B is a sequence chart showing an example 2 of the data linkage processing according to the data linkage SC serving as the overall system in the first embodiment.

FIGS. 12A and 12B show the flow of the external system linkage processing according to the data linkage SC serving as the entire system in the first embodiment. In the following description each type of SC executed and referred to, is already deployed in the distribution ledger D1.

FIG. 12A shows the pattern example 1 of the external system linkage processing, in which the requesting organization is capable of accessing the data of the external system 5, and linkage processing is performed by agent linkage by way of the external linkage agent 43.

In this case the client node 4 serving as the requesting organization start the data linkage request. At the time of the request, the client node 4 performs linkage processing with the external system 5 in advance and the linkage processing results may be or not be packed into the same execution TX for the data linkage SC. Performing the linkage processing with the external system 5 in advance allows reducing the number of execution TX by 1 but there is the possibility that deviations may occur in the execution timing.

The client node 4 serving as the requesting organization issues an execution TX "data linkage request" of the data linkage SC to the distributed ledger node 3.

When the distributed ledger node 3 on the other hand receives the above described execution TX, the data linkage request processing S3 is implemented according to the received execution TX while forming a consensus among other nodes.

In the current processing, the distributed ledger node 3 registers request information included in the above described execution TX, and the temporary data when the data linkage processing is already complete via the requesting organization in the distributed ledger D1. Selection of the organization is then performed according to data linkage adjustment and convergence rules D120 and the linkage processing event for this request is issued.

When the external linkage agent 43 from the client node 4 of each organization receives the above described linkage processing event, the external linkage agent 43 executes the linkage processing by accessing the external system 5 when the client node itself is the process supervisory organization. This external linkage agent 43 then issues an execution TX "data linkage adjustment and convergence" of the data linkage SC that includes the linkage processing result, to the distributed ledger node 3.

On the other hand, when each distributed ledger node 3 accepts the above described execution TX from the external linkage agent 43, the distributed ledger node 3 implements the data linkage adjustment and convergence process S4 according to the accepted execution TX while forming a consensus among other nodes. In this case, the distributed ledger node 3 registers the process execution results from each organization contained in the above described execution TX as temporary data into the distributed ledger D1. The distributed ledger node 3 also performs data tolerance range judgement and number of organizations consensus judgement according to the data linkage adjustment and convergence rules D120, and when the consensus standards for both judgments are satisfied, performs the above described temporary data adjustment and convergence processing. Also the distributed ledger node 3 registers the result of the temporary data adjustment and convergence processing as the confirmed data into the distributed ledger D1.

On the other hand, as the pattern example 2 for the external system linkage processing, FIG. 12B shows an example of the requesting organization that cannot access data in the external system 5 and that performs linkage processing by external system access within the SC. The basic flow is however the same as pattern example 1.

The points where pattern example 2 differs from pattern example 1 are: the point that the external linkage agent 43 is not used since external system access is carried out by processing within the SC, the point that selecting an organization is unnecessary since the executor and approver organization that requests consensus forming of the execution TX also performs organizational processing of data linkage, and the point that the data linkage request and adjustment and convergence processing are performed within a single TX process.

Direct access is assumed in the external system API 51 when accessing the external system 5 by SC internal processing.

External system linkage is not limited to the methods shown in pattern examples 1 and 2, and an optional combination of linkage method and external data access availability by the requesting organization is possible.

Internal Processing in the Data Linkage SC

Figure 13:
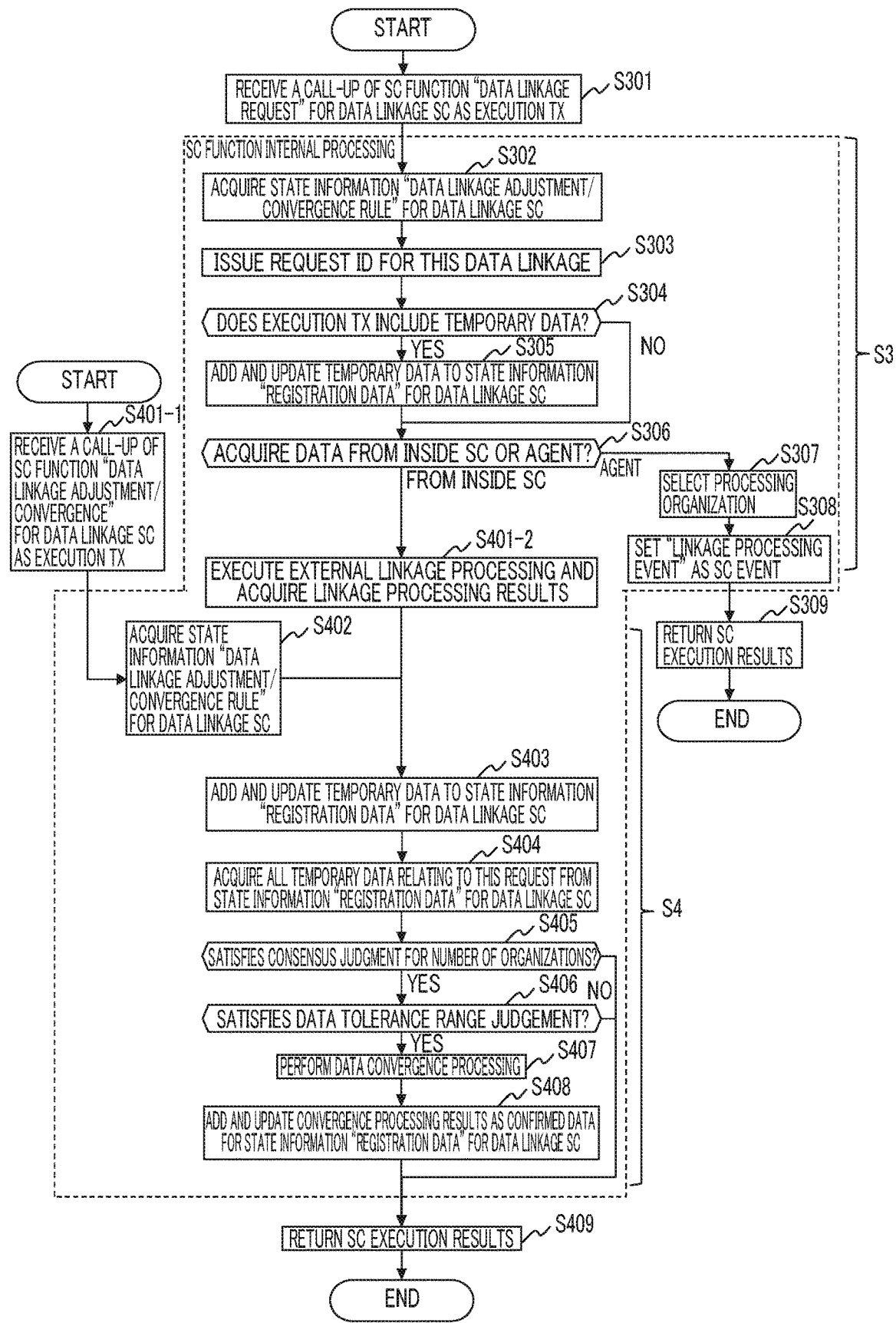
FIG. 13 is a flow chart showing an example of internal processing of the data linkage SC.

FIG. 13 is a flow chart showing an example of internal processing (data linkage request and data linkage adjustment and convergence) within the data linkage SC. In the description from hereon, the above mentioned "excellent customer analysis" of "business B" is specifically described.

In this case, when each distributed ledger node 3 receives a call from the SC function (data linkage request) of data linkage SC_D12 as the execution TX (step S301), the distributed ledger node 3 executes the data linkage processing according to the execution TX by way of the SC execution/manager 32. Here, an input "customer b" for the "customer ID" is included as the argument for the SC function.

Next, each distributed ledger node 3 acquires the state information "data linkage adjustment and convergence rules" of the data linkage SC_D12 (step S302). As a specific example, in description for data linkage adjustment and convergence shown in FIG. 8, line D12021 is a data linkage adjustment and convergence rule relating to the "excellent customer analysis" of "business B".

Next, a request ID is issued by the data linkage SC_D12 to uniquely specify the data linkage request (step S303).

Next, the data linkage SC_D12 judges whether the above described execution TX includes temporary data from the requesting organization as the argument (step S304).

When the results from the above described judgement are that temporary data is included (YES in step S304), the data linkage SC_D12 adds and updates the temporary data to the state information "Register information" (step S305).

On the other hand, when the results from the above described judgement are that temporary data as the argument is not included (No in step S304), the data linkage SC_D12 skips step S305.

Afterwards, the data linkage SC_D12 refers to the acquired D12009 in the data linkage adjustment and convergence rule D120, and judges whether the data linkage processing is implemented via the linkage agent or from the acquired data within the SC (step S306).

When the results of the above judgment show implementation via the linkage agent (agent in step S306:), the data linkage SC_D12 selects the processing organization according to the configuration information D2 and the processing organization select method D12007 of the data linkage adjustment and convergence rules D120 (step S307).

The data linkage SC_D12 then generates a linkage processing event and sets the linkage processing event as the SC event based on information recorded in the data linkage adjustment and convergence rules D120, the state ID as the target generated from an input and its information from the argument of the SC function, and the information of the processing organization selected in step S307 (step S308).

The SC event is in this way issued during block confirmation for the current TX and notification is given to the external linkage agent 43 for each organization. The data linkage SC_D12 subsequently returns the SC execution results (step S309) and the processing ends.

On the other hand, when the external linkage agent 43 for the client node 4 of each organization receives the above described linkage processing event, the external linkage agent accesses the external system 5 and performs the linkage processing when the external linkage agent 43 itself is the process supervisory organization. The external linkage agent 43 then issues the execution TX "data linkage adjustment and convergence" for the data linkage SC_D12 including the linkage processing results to the distributed ledger node 3.

Conversely, when each distributed ledger node 3 receives a call of SC function "data linkage adjustment and convergence" from the data linkage SC_D12 as the execution TX (step S401-1), the distributed ledger node 3 executes the subsequent data linkage adjustment and convergence process according to the TX by way of the function of the SC execution/manager 32.

Here, the argument for the SC function includes temporary data from the external system linkage processing performed at each organization (may even include external processing evidence).

When receiving TX, each distributed ledger node 3 acquires the state information "data linkage adjustment and convergence rules" of the data linkage SC_D12, the same as in step S302 (step S402). The distributed ledger node 3 adds and updates the temporary data contained in the argument to the state information "Register information" of data linkage SC_D12 (step S403).

Next, the distributed ledger node 3 acquires all temporary data relating to the data linkage request from the state information "Register data" of data linkage SC_D12 (step S404). The example for a request ID of "2001" is equivalent to lines D12124 to D12126.

Each of the distributed ledger nodes 3 performs a number of organizations consensus judgment (step S405) and a tolerance range judgement (step S406) for the data based on temporary data acquired in the above described step S404 and the consensus standard D12003 for the data linkage adjustment and convergence rules.

Each of the distributed ledger nodes 3 skips the subsequent processing, returns the SC execution results (step S409) and ends the process unless each of the above judgements satisfies the predetermined standards in the judgement (YES in step S405, YES in step S406).

However, when both judgments in the above step S405 and step S406 satisfy the predetermined standards (YES in step S405, YES in step S406), each of the distributed ledger nodes 3 performs data convergence processing based on the convergence method D12006 of the data linkage adjustment and convergence rules (step S407).

Each of the distributed ledger nodes 3 adds and updates the data convergence processing results in step S407 as the confirmed data for the state information "Register data" of the data linkage SC_D12 (step S408).

Each of the distributed ledger nodes 3 then returns the confirmed data in step S408 as the SC execution results (step S409) and ends the process.

Also, in the example for a request ID of "2001", the number of organizations is 3 or more and the value and the time are within the tolerance range from lines D12124 through D12126. The maximum value for the time (omitted): 35, and the minimum value for the value "89" are set as the confirmed data by the convergence processing. In this example, the storage results for the confirmed data are just as shown in line D12127.

When the above mentioned processing results in step S306 are "within the Sc", each of the distributed ledger nodes 3 in the subsequent process of the data linkage request performs the external linkage processing from within the SC and acquires the linkage processing results (step S401-2) and afterwards executes processing in the same way from step S403 onwards.

External Linkage Agent Processing

Figure 14:
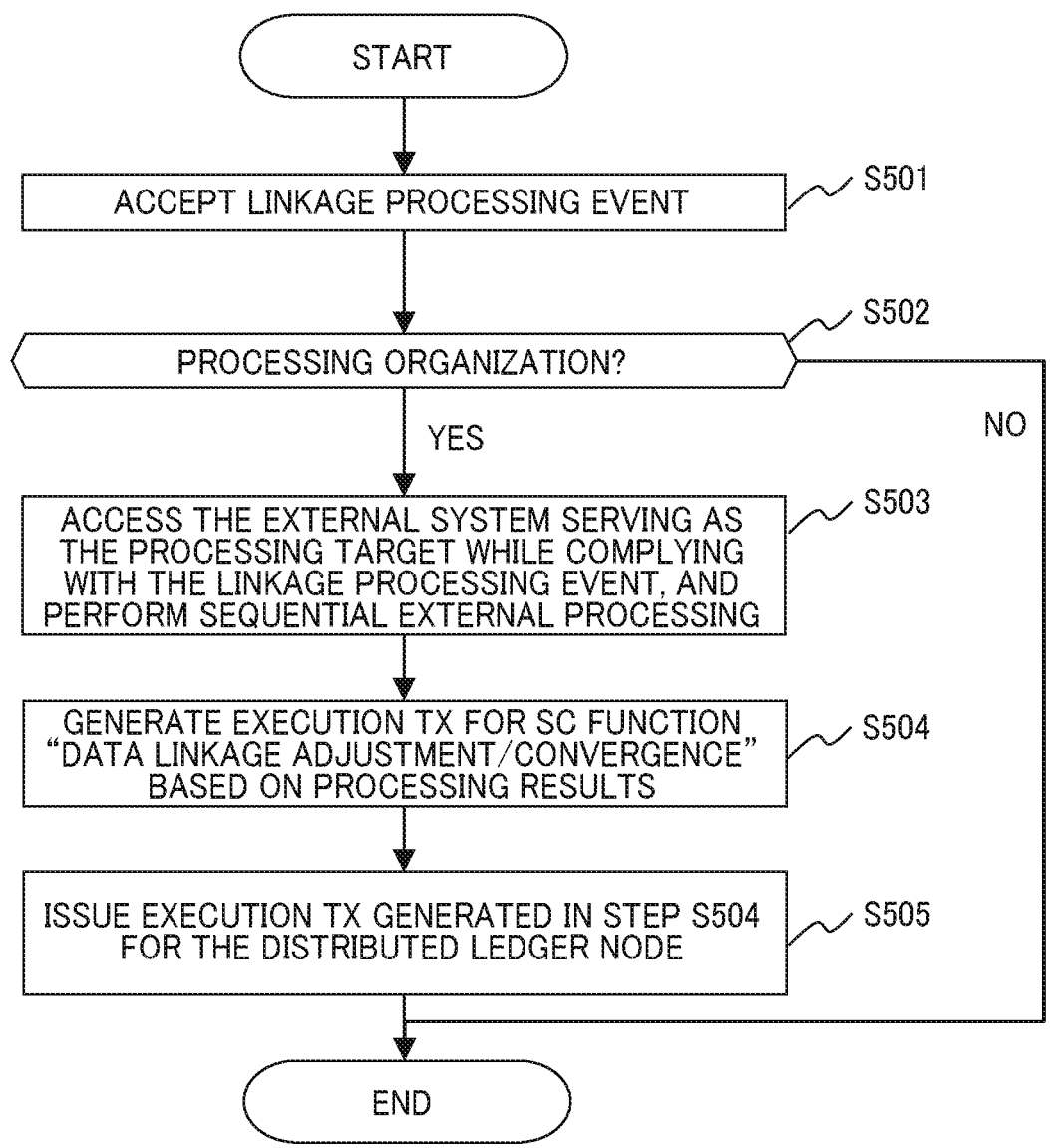
FIG. 14 is a flow chart showing an example of the processing of an external linkage agent.

FIG. 14 is a flow chart showing an example of the processing of the external linkage agent 43. The external linkage agent 43 of each organization's client node 4, receives the linkage processing event (step S501) and confirms whether or not the external linkage agent 43 itself is a processing organization (step S502).

When the external linkage agent 43 is not the processing organization from the result in the above step S502 (NO in step S502), the external linkage agent 43 skips the subsequent processing and ends the processing.

On the other hand, when the external linkage agent 43 is the processing organization from the above results in step S502 (YES in step S502), the external linkage agent 43 accesses the external system 5 serving as the target for processing and performs the sequential external processing while complying with the linkage processing event (step S503).

Further, the external linkage agent 43 generates the execution TX of the SC function "data linkage adjustment and convergence" of the data linkage SC_D12 based on processing results in step S503 (step S504).

Also, the external linkage agent 43 issues the execution TX generated in the above step S504 to the distributed ledger node 3 (step S505) and ends the processing.

As shown above, a plurality of paths coupling to the external system 5 (non-distributed ledger system) are available to avoid dependence on a single organization. By specifying the tolerance range (width) of the data and its convergence method (data linkage adjustment and convergence rule) for the data input/output results by way of the external system 5 by the plurality of organizations as the data linkage SC (shared framework); and by performing data linkage processing according to the data linkage adjustment and convergence rules defined by the data linkage SC; the data acquisition and processing results by way of the external system 5 can be converged by the plurality of organizations as unique data within a specified range.

By utilizing the unique features of the present technology, safe exchanges of data can be performed between the distributed ledger system 10 and the external system 5 (non-distributed ledger system), with the distributed ledger system 10 capable of performing processing, even if variations occur among the above described data acquisition and processing results due to the data input/output timing, method, and rights with the external system 5 (non-distributed ledger system) by the plurality of organizations.

Also, a linkage with external data can be achieved without relying on a single organization according to the agreement with the consortium since the SC functions manage the data on a plurality of distributed ledger nodes 3. An effect from non-deterministic data handling can also be achieved based on consensus forming with the business (SC) layer. A further effect is that data linkage can be implemented while retaining the objectivity of the data without having to rely on a single organization and without having to apply measures to the external system 5 side.

To simplify the description, the example of the present embodiment shows the storing of one transaction for one block, however a plurality of transactions may be stored. The present invention is also capable of adapting to that case.

The configuration information D2 is described as data managed within the functions of the distributed ledger node 3 however the data may also be managed on the SC. Any method may be utilized if capable of confirming the configuration information by the plurality of organizations.

The calculation logic for the data linkage adjustment and convergence rules D120 may be defined within the argument as a metalanguage or a domain specific language (DSL), or may be embedded beforehand in the SC function. Applying the above described metalanguage allows external definition and has the advantage of boosting the flexibility. On the other hand, embedding in the SC function offers the advantage of easy management.

Second Embodiment

Hereafter, different variations of the embodiments of the present invention are shown. These variations are fundamentally based on the first embodiment so commonly shared descriptions are omitted.

In contrast to the first embodiment described above, the example shown for the second embodiment manages transient data serving as temporary data up until data confirmation in a private distributed ledger and deletes data that is no longer needed. The second embodiment differs from the first embodiment in that temporary data is managed on the private distributed ledger D4 and further in the point of utilizing a SC function "temporary data deletion" in FIG. 6. All other processing is basically the same as the first embodiment.

Figure 15:
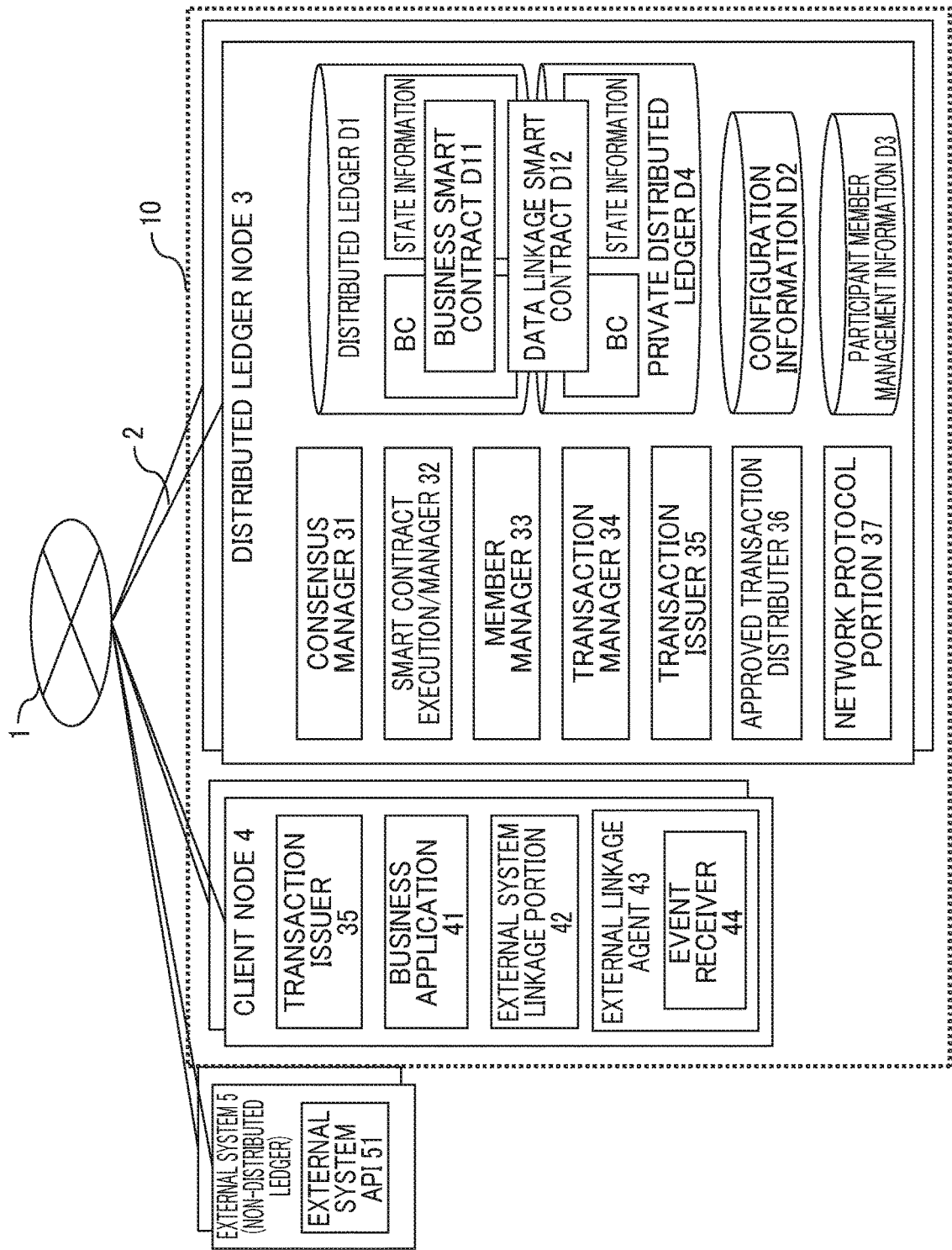
FIG. 15 is a drawing showing a configuration example of the computer system of the second embodiment.

FIG. 15 is a diagram showing the assumed computer system of the second embodiment. The computer system of FIG. 15 is fundamentally the same as the computer system of the first embodiment but differs in the point that a private distribution ledger D4 is added.

In this case, the temporary data of the registration data D121 is stored in the private distribution ledger D4 rather than the distributed ledger D1. Also, after confirming completion of each processing such as convergence of the relevant data, the SC function "temporary data deletion" is called up and the temporary data for the confirmed data is deleted.

This temporary data deletion may be implemented according to the appropriate conditions such as the size of the available free space in the private distribution ledger D4.

The configuration example of the second embodiment in this way allows employing transient intermediate data called temporary data with no worry of contamination. The effect is also rendered that deleting appropriate data from the private distribution ledger D4 reduces the volume of data.

Third Embodiment

In contrast to the first embodiment described above, the example shown for the third embodiment calculates the degree of trustworthiness of the relevant organization and feeds back the results to a consortium or each organization based on the contents (pass/fail) registered for each organization relating to the data linkage processing.

FIG. 16 is a drawing showing the data linkage pass-fail results managed as the state information of the data linkage SC_D12. This state information is managed as judgement results for the data tolerance judgement (step S406) for the data linkage adjustment and convergence process S4.

After the process step S406 in the first embodiment, the data linkage pass-fail results are added to the state information "data linkage pass-fail result 122" of data linkage SC_D12 and updated.

Columns D12200 through D12203 are respectively the same as the columns D12100 through D12103. The organization D12204 is the organization that performed the current process.

Also, the judgment result D12205 is the tolerance range judgement result for this data and is recorded as "Pass" or "Fail" according to the judgement. Reason D12206 is information showing the reason that the judgment "Fail" is given.

FIG. 17 is a drawing showing the data linkage credit analysis results D123 managed as the state information for the data linkage SC_D12.

The data linkage credit analysis results D123 is information showing the trustworthiness of each organization corresponding to state types serving as the target for a data linkage SC_D12. D12300 and D12301 show the SC_ID and the state type of the data linkage SC_D12. D12300 and D12301 are the same as D12000 and D12001.

The organization D12302 is the result from scoring the degree of trustworthiness of the organizations by the state type of the data linkage SC_D12. Also, the trustworthiness D12303 is the result from scoring the degree of trustworthiness of the relevant organization.

Figure 18:
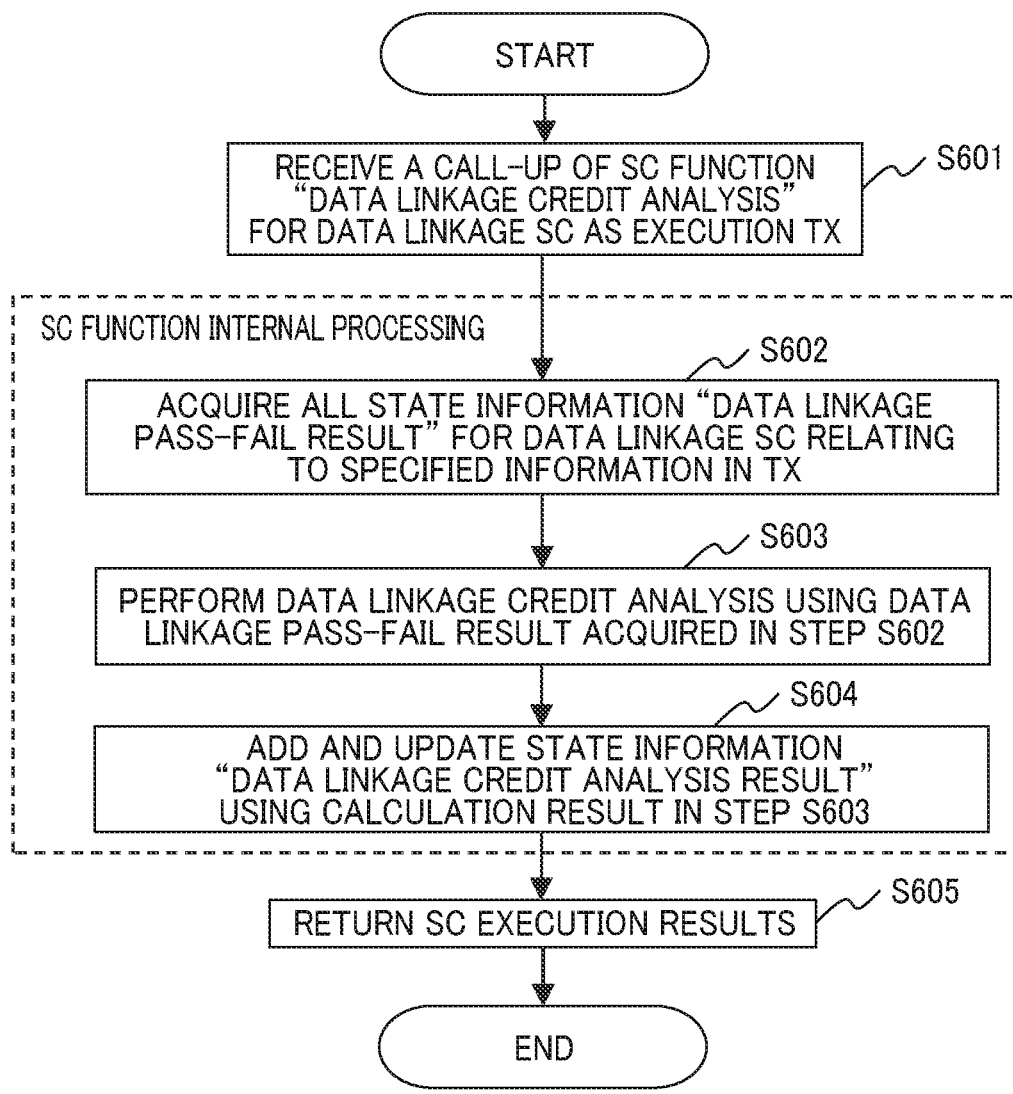
FIG. 18 is a flow chart showing an example of the data linkage credit analysis processing in the third embodiment.

FIG. 18 is a flow chart showing an example of the data linkage credit analysis processing of the third embodiment. In this embodiment, the degree of trustworthiness of each organization per state type serving as the target for a data linkage SC_D12 is calculated as (data linkage success count for target organization/total data linkage request cases)×100.

In this case, each distributed ledger node 3 receives a call up of the SC function "data linkage credit analysis" of the data linkage SC_D12 as the execution TX (step S601).

Each of the distributed ledger nodes 3 next executes the data linkage processing according to the execution TX by way of the function of SC execution/manager 32. Here, the information for the target organization is included as the argument for the SC function Each of the distributed ledger nodes 3 acquires all of the state information "data linkage pass-fail result 122" for the data linkage SC_D12 (step S602). Each of the distributed ledger nodes 3 then performs data linkage credit analysis using the data linkage pass-fail result 122 acquired in the above S602 (step S603). This analysis is equivalent to the above mentioned calculation for the degree of trustworthiness (data linkage success count for target organization/total data linkage request cases)×100.

Next, each of the distributed ledger nodes 3 adds to the state information "data linkage credit analysis result 123" using the calculation results of the above step S603 and updates the state information (step S604).

Then, each of the distributed ledger nodes 3 returns the SC execution results based on the data linkage credit analysis result 123 acquired in the above step S604 (step S605) and ends the process.

By referring to the data linkage pass-fail results of the organization and the data linkage credit analysis results by inquiries from each organization, the third embodiment renders the effect of knowing the degree of trustworthiness of one's own organization, the degree of trustworthiness of each organization, or the degree of data linkage accuracy. Further, by selecting the data linkage processing organization according to the degree of trustworthiness, the embodiment renders the effect of improving the success rate of the data linkage.

Each of the above described embodiments shows examples with the business SC and the data linkage SC separated from each other in order to simplify the description, however the data linkage SC may be enclosed within the business SC. That arrangement provides the advantage that processing can be concluded within a single SC.

Each embodiment also shows examples of time and numerical values, however, the invention is not limited to these times and numerical values. For example, convergence of the OK/NG judgement or character string may be selectively applied. In this case, a method for judgement and convergence by way of the OK/NG matching rate or the character string matching rate can also be considered.

Rather than processing aiming at providing a width for all data, just providing a width for a portion of the data and accepting only all other portions that are a complete match is also acceptable.

Further, examples of data linkage between a distributed ledger system and non-distributed ledger system are given, however the present invention can also apply to data linkage within a single distributed ledger system and data linkage within a plurality of distributed ledger systems. For data linkage between distributed ledgers, provision of a separately obtained method for safely exchanging data as standard can be expected. However, if such a method is not provided or exceptional unavoidable use is required, then the present invention can be applied to achieve a safe exchange of data.

The tolerance range judgement processing of external data linkage and the processing to converge into a single entry are shown as the function of SC, however they are not limited to this implementation method. Specifically, these processings can be implemented as a base function of a distributed ledger node (same as function units 31 through 37). This arrangement renders the advantage that the present invention can provide higher compulsory power as a base.

The embodiments of the present invention are described in detail above based on the drawings, however the present invention is not limited to a specific configuration and may include designs etc. within a scope not departing from the substance and spirit of the invention.

The present invention as described above is capable of satisfactory processing in conformance with predetermined rules even if variations occur in the data being handled due to reasons including the access rights, method, or data input/output timing with the non-distributed ledger system by the plurality of organization in the distributed ledger system. Also, another effect is that data can be safely exchanged between distributed ledger systems and non-distributed ledger systems. Further, another effect is that objectivity is provided for data processing and registration by way of the relevant non-distributed system without depending on a single organization and without making changes on the non-distributed ledger system side.

In other words, efficient data linkage between the distributed ledger system and the non-distributed ledger system can be achieved without depending on a single organization, and further while implementing along with retaining objectivity.

The description of the specifications clearly reveals at least the following. Namely, in the data linkage management method of the embodiments, each node may also hold convergence method rules for converging the data acquired by each node into single data that is single unique data. Each node may apply tolerance of discrepancies in data, by performing convergence processing for confirming the data that is shown by the transaction as a single data according to the convergence rules, and storing the confirmed single data in the distributed ledger.

Discrepancies between data among nodes that are acquired from external systems can in this way be efficiently converged and therefore a more efficient data linkage between the distributed ledger system and the non-distributed ledger system can be implemented without dependency on a single organization and while retaining objectivity.

Also, in the data linkage management method of the present embodiments, in regard to data linkage methods between distributed ledger systems and external systems, each node may manage tolerance range rules and convergence method rules at least as a specified data linkage smart contract.

The forming of single data based on tolerance range rules and based on convergence method rules can in this way be efficiently performed. Therefore, a more efficient data linkage can be implemented between a distributed ledger system and a non-distributed ledger system without dependency on a single organization and while retaining objectivity.

Also in the data linkage management method of the present embodiments, each node stores the data acquired by each node as temporary data in the distributed ledger, and during the judgment and the convergence processing, the temporary data may be acquired from the distributed ledger and be set as the target for the judgement and the convergence processing.

The data prior to confirmation can in this way be easily handled and the utilization efficiency of the distributed ledger increases, and therefore a more efficient data linkage can be formed between the distributed ledger system and the non-distributed ledger system without dependency on a single organization and while retaining objectivity.

Also, in the data linkage management method of the embodiments, each node includes a second distributed ledger, the temporary data may be stored in the second ledger, and the temporary data for the confirmed data that underwent the judgment and the convergence processing may be further deleted from the second distribution ledger.

In this way, along with easy handling of the data prior to confirmation, the utilization efficiency of the distributed ledger can be increased by deleting the temporary data that is converged and confirmed according to the convergence method rules. Therefore a more efficient data linkage can be formed between the distributed ledger system and the non-distributed ledger system without dependency on a single organization and while retaining objectivity.

Also, in the data linkage management method of the embodiments, each node further includes organization selection rules for selecting an organization coupling to the external system from among the plurality of organizations in the data linkage smart contract. The relevant organization selection rule can be applied to the predetermined configuration information held beforehand for the plurality of organizations, and the processing for selecting an organization coupling to the external system may be performed.

An organization acquiring data from an external system can in this way be efficiently selected according to the access rights, etc. Therefore, a more efficient data linkage can be formed between the distributed ledger system and the non-distributed ledger system without dependency on a single organization and while retaining objectivity.

Also, in the data linkage management method of the embodiments, along with issuing a predetermined event in the data linkage smart contract, the specified external linkage agent that is contained within each information processing device of the organization among the plurality of organizations, may receive the event, implement processing relating to the external system, and notify the processing results to the data linkage smart contract.

The external linkage agent can in this way manage specific, detailed data acquisition processing so that more flexible external system linkage processing can be easily performed. Therefore, a more efficient data linkage can be formed between the distributed ledger system and the non-distributed ledger system without dependency on a single organization and while retaining objectivity.

Also, in the data linkage management method of the embodiments, each node may embed processing content relating to the external system, into the issued predetermined event of the data linkage smart contract, and the external linkage agent may execute processing relating to the external system according to the embedded processing content.

In this way, more flexible external system linkage processing can be even more efficiently performed and therefore a more efficient data linkage can be formed between the distributed ledger system and the non-distributed ledger system without dependency on a single organization and while retaining objectivity.

Further, in the data linkage management method of the embodiments, each node may hold the results of the tolerance pass-fail judgment according to the tolerance range rules, and calculate the respective degree of trustworthiness of the plurality of organizations based on the judgment results.

The trustworthiness of data for respective organizations can in this way be clearly presented and the handling of the relevant organization can be considered according to trustworthiness of data for the organization. Therefore, a more efficient data linkage can be formed between the distributed ledger system and the non-distributed ledger system without dependency on a single organization and while retaining objectivity.

What is claimed is:

1. A data linkage management method for linking data between a distributed ledger system and an external system, wherein the distributed ledger system includes a plurality of distributed ledger nodes and a plurality of client nodes, and wherein the external system is a non-distributed ledger system, the method comprising:

configuring each distributed ledger node of a specified plurality of organizations among the plurality of distributed ledger nodes to hold a tolerance range rule that defines a tolerance range relating to discrepancies among data acquired from a specified external system in each distributed ledger node, wherein each distributed ledger node is further configured to hold a convergence method rule that converges the data acquired by each distributed ledger node into single data that is single unique data;

issuing, by a client node, a data linkage request to a distributed ledger node;

receiving, by the distributed ledger node, the data linkage request from the client node and forming, by the distributed node, a consensus among the plurality of distributed ledger nodes by tolerating discrepancies among the data by passing a tolerance pass-fail judgment relating to discrepancies among the data according to the tolerance range rule in regards to a transaction issued by each node for the data;

performing, by the distributed ledger node, convergence processing that confirms the data with unique values that the transaction specifies, into the single data according to the convergence method rule when the discrepancies are tolerated; and storing the confirmed single data into the distributed ledger.

2. The data linkage management method according to claim 1, wherein, in regards to the data linkage method between the distributed ledger system and the external system, each distributed ledger node manages the tolerance range rule and the convergence method rule at least as a specified data linkage smart contract.

3. The data linkage management method according to claim 2, wherein, each distributed ledger node stores the data acquired by each distributed ledger node as temporary data in the distributed ledger, and during the judgment and the convergence processing, the temporary data is acquired from the distributed ledger and is set as the target for the judgement and the convergence processing.

4. The data linkage management method according to claim 3, wherein, each distributed ledger node includes a second distributed ledger, stores the temporary data in the second distributed ledger, and further executes processing to delete the temporary data that is confirmed after the judgement and the convergence processing, from the second distributed ledger.

5. The data linkage management method according to claim 2, wherein, in the data linkage smart contract, each distributed ledger node further includes an organization selection rule that selects an organization to couple to the external system from among the plurality of organizations, and further executes processing to select an organization to couple to the external system by applying the organization selection rule to a specified configuration information held beforehand relating to the plurality of organizations.

6. The data linkage management method according to claim 2, wherein, along with issuing a specified event in the data linkage smart contract, a specified external linkage agent included in the respective information processing devices of the plurality of organizations, receives the event, executes processing relating to the external system, and notifies the data linkage smart contract of the processing results.

7. The data linkage management method according to claim 6, wherein, in the data linkage smart contract, each distributed ledger node embeds processing content relating to the external system in the specified event that is issued, and the external linkage agent executes processing relating to the external system according to the embedded processing content.

8. The data linkage management method according to claim 1, wherein, each distributed ledger node holds judgement results on the tolerance pass-fail according to the tolerance range rule, and calculates a respective degree of trustworthiness of the plurality of organizations based on the judgement results.

9. A data linkage management system for linking data between a distributed ledger system and an external system, wherein the distributed ledger system includes a plurality of distributed ledger nodes, wherein, at least each distributed ledger node of a specified plurality of organizations among the plurality of distributed ledger nodes holds a tolerance range rule that defines a tolerance range relating to discrepancies among data acquired from a specified external system in each distributed ledger node, wherein each distributed ledger node holds a convergence method rule that converges the data acquired by each distributed ledger node into single data that is single unique data;

wherein each distributed ledger node forms a consensus among the plurality of distributed ledger nodes by tolerating discrepancies among the data by passing a tolerance pass-fail judgment relating to discrepancies among the data according to the tolerance range rule in regards to a transaction issued by each node for the data; and wherein each distributed ledger node performs convergence processing that that confirms the data with unique values that the transaction specifies, into the single data according to the convergence method rule when the discrepancies are tolerated and stores the confirmed single data into the distributed ledger, and forms a consensus by tolerating discrepancies among the data by passing a tolerance pass-fail judgment relating to discrepancies among the data according to the tolerance range rule in regards to a transaction issued by each node for the data.

* * * * *